(12) United States Patent
Han et al.

(10) Patent No.: US 12,284,926 B2
(45) Date of Patent: Apr. 29, 2025

(54) TRANSMISSION OF AGRICULTURAL VEHICLE

(71) Applicant: LS MTRON LTD., Anyang-si (KR)

(72) Inventors: Jung Su Han, Anyang-si (KR); Won Woo Park, Anyang-si (KR); Ji Hun Yu, Anyang-si (KR); Taek Seong Kim, Anyang-si (KR); Young Gyu Lee, Anyang-si (KR); Jae Gone Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 18/784,300

(22) Filed: Jul. 25, 2024

(65) Prior Publication Data

US 2024/0373773 A1    Nov. 14, 2024

Related U.S. Application Data

(63) Continuation of application No. 17/439,283, filed as application No. PCT/KR2020/003739 on Mar. 19, 2020, now Pat. No. 12,075,715.

(30) Foreign Application Priority Data

Mar. 20, 2019  (KR) .................. 10-2019-0031888
Mar. 17, 2020  (KR) .................. 10-2020-0032367
Mar. 18, 2020  (KR) .................. 10-2020-0033102

(51) Int. Cl.
*F16D 13/38* (2006.01)
*A01B 33/08* (2006.01)
(Continued)

(52) U.S. Cl.
CPC ............ *A01B 33/082* (2013.01); *F16D 13/38* (2013.01); *F16H 3/44* (2013.01); *F16H 57/10* (2013.01)

(58) Field of Classification Search
CPC ....... A01B 33/082; A01B 33/08; F16H 3/006; F16H 3/44; F16H 57/10; F16H 37/043;
(Continued)

(56) References Cited

U.S. PATENT DOCUMENTS 3,916,711 A    11/1975 Hoyer
4,023,418 A     5/1977 Zenker
(Continued)

FOREIGN PATENT DOCUMENTS

CA    2200483 A1    9/1997
CN    101398079 A    4/2009
(Continued)

OTHER PUBLICATIONS

International Search Report for related International Application No. PCT/KR2020/003739; report dated Sep. 24, 2020; (5 pages).
(Continued)

*Primary Examiner* — Lori Wu
(74) *Attorney, Agent, or Firm* — K&L Gates LLP

(57) ABSTRACT

The present disclosure relates to a transmission of an agricultural vehicle, the transmission including: a forward shift unit for performing shift with respect to drive transmitted from an engine of an agricultural vehicle; a clutch unit connected to the forward shift unit so as to selectively output drive transmitted from the forward shift unit; an adjustment unit connected to the clutch unit; and a backward shift unit connected to the adjustment unit so as to perform shift with respect to drive transmitted from the adjustment unit. The adjustment unit includes: a first adjustment mechanism connected to a first clutch mechanism included in the clutch unit; a second adjustment mechanism connected to a second clutch mechanism included in the clutch unit; and an integration mechanism connected to both the first adjustment mechanism and the second adjustment mechanism. The
(Continued)

backward shift unit includes one backward shift mechanism connected to the integration mechanism.

5 Claims, 17 Drawing Sheets

(51) Int. Cl.
    *F16H 3/44*     (2006.01)
    *F16H 57/10*     (2006.01)

(58) Field of Classification Search
    CPC .............. F16H 2037/045; F16D 13/38; B60Y 2200/22
    See application file for complete search history.

(56) References Cited

U.S. PATENT DOCUMENTS

| | | |
|---|---|---|
| 4,579,015 A | 4/1986 | Fukui |
| 2016/0146320 A1 | 5/2016 | Mordukhovich |
| 2016/0312872 A1 | 10/2016 | Hirase |
| 2017/0350486 A1 | 12/2017 | Bailly |
| 2018/0112754 A1 | 4/2018 | Buhrke |

FOREIGN PATENT DOCUMENTS

| | | |
|---|---|---|
| CN | 201841948 U | 5/2011 |
| CN | 106965671 A | 7/2017 |
| CN | 109068570 A | 12/2018 |
| EP | 2578901 A1 | 4/2013 |
| FR | 2510492 A1 | 2/1983 |
| FR | 2838798 A1 | 10/2003 |
| IT | RE960021 A1 | 9/1997 |
| JP | H1026189 A | 1/1998 |
| JP | 2001105905 A | 4/2001 |
| KR | 1019900012023 A | 8/1990 |
| KR | 10-0524564 B1 | 10/2005 |
| KR | 10-1927449 B1 | 12/2018 |
| WO | 20110152374 A1 | 12/2011 |

OTHER PUBLICATIONS

Written Opinion for related International Application No. PCT/KR2020/003739; report dated Sep. 24, 2020; (5 pages).

Japanese Office Action for related Japanese Application No. 2021-555328; action dated Sep. 13, 2022; (7 pages).

Chinese Office Action for related Chinese Application No. 202080015417.9; action dated Jul. 1, 2022; (8 pages).

Office Action for related Chinese Application No. 202080015417.9; action dated Feb. 28, 2023; (9 pages).

Extended Search Report for related European Application No. 20773596.0; action dated Nov. 23, 2022; (8 pages).

Office Action for related Korean Application No. 10-2020-0033102; action dated Aug. 29, 2024; (7 pages).

TRANSMISSION OF AGRICULTURAL VEHICLE

CROSS-REFERENCE TO RELATED APPLICATIONS

The present application is a U.S. Continuation Application of U.S. application Ser. No. 17/439,283, filed on Sep. 14, 2021, which is a National Stage of International Application No. PCT/KR2020/003739 filed on Mar. 19, 2020, which claims priority to Korean Application No. 10-2019-0031888, filed Mar. 20, 2019, Korean Application No. 10-2020-0032367, filed Mar. 17, 2020, and Korean Application No. 10-2020-0033102, filed Mar. 18, 2020, the disclosures of which are incorporated herein by reference.

FIELD

The present disclosure relates to a transmission of an agricultural vehicle which adjusts a speed of an agricultural vehicle.

BACKGROUND

Agricultural working vehicles are used to cultivate crops, which are required for human life, using soil. For example, combines, tractors, rice transplanters, and the like are examples of the agricultural working vehicles. Combines reap and thresh crops such as rice, barley, wheat, and beans. Tractors perform work required to cultivate crops using traction force. Rice transplanters perform work of transplanting rice seedlings grown in seed beds or seedling boxes to paddy fields.

The agricultural vehicle includes a transmission apparatus in order to adjust a torque, a speed, and the like in a work process as necessary.

FIG. 1 is a schematic block diagram illustrating a transmission of an agricultural vehicle according to a conventional technology.

Referring to FIG. 1, a transmission apparatus 100 of an agricultural vehicle according to the conventional technology includes a first transmission part 110 which shifts power transmitted from an engine 10 and a second transmission part 120 which shifts the power transmitted from the first transmission part 110.

The first transmission part 110 includes a first driving shaft 111, a first transmission gear 112, a second transmission gear 113, a first sleeve 114, a second driving shaft 115, a third transmission gear 116, a fourth transmission gear 117, and a second sleeve 118.

The first transmission gear 112, the second transmission gear 113, and the first sleeve 114 are coupled to the first driving shaft 111.

The first transmission gear 112 and the second transmission gear 113 are coupled to the first driving shaft 111 to be idling. The second transmission gear 113 and the first transmission gear 112 are formed to have diameters that are different from each other.

The first sleeve 114 is coupled to the first driving shaft 111 to be positioned between the first transmission gear 112 and the second transmission gear 113. The first sleeve 114 and the first driving shaft 111 are coupled to rotate together. In a case in which the first sleeve 114 is not engaged with both the first transmission gear 112 and the second transmission gear 113, the first sleeve 114 enters a neutral state. In a case in which the first sleeve 114 is engaged with the first transmission gear 112 or the second transmission gear 113, the first sleeve 114 enters an engagement state.

The third transmission gear 116, the fourth transmission gear 117, and the second sleeve 118 are coupled to the second driving shaft. The second driving shaft 115 and the first driving shaft 111 are disposed to be parallel to each other.

The third transmission gear 116 and the fourth transmission gear 117 are coupled to the second driving shaft 115 to be idling. The fourth transmission gear 117 and the third transmission gear 116 are formed to have diameters that are different from each other.

The second sleeve 118 is coupled to the second driving shaft 115 to be positioned between the third transmission gear 116 and the fourth transmission gear 117. The second sleeve 118 and the second driving shaft 115 are coupled to rotate together. In a case in which the second sleeve 118 is not engaged with both the third transmission gear 116 and the fourth transmission gear 117, the second sleeve 118 enters a neutral state. In a case in which the second sleeve 118 is engaged with the third transmission gear 116 or the fourth transmission gear 117, the second sleeve 118 enters an engagement state.

In this case, in the transmission apparatus 100 of an agricultural vehicle according to the conventional technology, when the first sleeve 114 and the second sleeve 118 enter the engagement states at the same time, there is a risk of the first transmission part 110 or the second transmission part 120 being damaged or broken. Accordingly, in the case in which the first sleeve 114 is in the engagement state, the second sleeve 118 should enter the engagement state after the first sleeve 114 enters the neutral state. In the case in which the second sleeve 118 is in the engagement state, the first sleeve 114 should enter the engagement state after the second sleeve 118 enters the neutral state. Accordingly, in the transmission apparatus 100 of an agricultural vehicle according to the conventional technology, since the process in which both the first sleeve 114 and the second sleeve 118 enter the neutral states should be performed, there is a problem in that vibrations and shocks occur during a power shift process.

SUMMARY

Accordingly, the present disclosure is designed to solve the problem described above and to provide a transmission of an agricultural vehicle with reduced vibrations and shocks occurring in a power shift process.

To solve the above problems, the present disclosure may include the following configurations.

A transmission of an agricultural vehicle according to the present disclosure may include a leading transmission part which shifts power transmitted from an engine of an agricultural vehicle, a clutch part connected to the leading transmission part to selectively output power transmitted from the leading transmission part, an adjustment part connected to the clutch part, and a following transmission part connected to the adjustment part to shift power transmitted from the adjustment part. The leading transmission part may include a first leading transmission unit which shifts the power transmitted from the engine and a second leading transmission unit which shifts the power transmitted from the engine. The clutch part may include a first clutch unit connected to the first leading transmission unit to selectively output power transmitted from the first leading transmission unit and a second clutch unit connected to the second leading transmission unit to selectively output power transmitted from the second leading transmission unit. The adjustment part may include a first adjustment unit connected to the first clutch unit, a second adjustment unit connected to the second clutch unit, and an integration unit connected to both the first adjustment unit and the second adjustment unit. The following transmission part may include one following transmission unit connected to the integration unit.

According to the present disclosure, the following effects can be obtained.

Since the present disclosure is implemented to further shift power, which is shifted by a leading transmission part, using one following transmission unit, the present disclosure can improve ease of manufacturing the following transmission part and contribute to reducing a manufacturing cost for the following transmission part.

Since the present disclosure is implemented to shift power even without performing a process in which all sleeves enter neutral states, vibrations and shocks occurring in a power shift process can be reduced, and thus the present disclosure can contribute to providing a stable driving environment to a driver.

Since the present disclosure is implemented so that a first leading transmission unit and a second leading transmission unit are shared or modularized, the present disclosure can improve ease of manufacturing the first leading transmission unit and the second leading transmission unit and contribute to reducing manufacturing costs of the first leading transmission unit and the second leading transmission unit.

DETAILED DESCRIPTION

Hereinafter, embodiments of a transmission of an agricultural vehicle according to the present disclosure will be described in detail with reference to the accompanying drawings.

Figure 1:
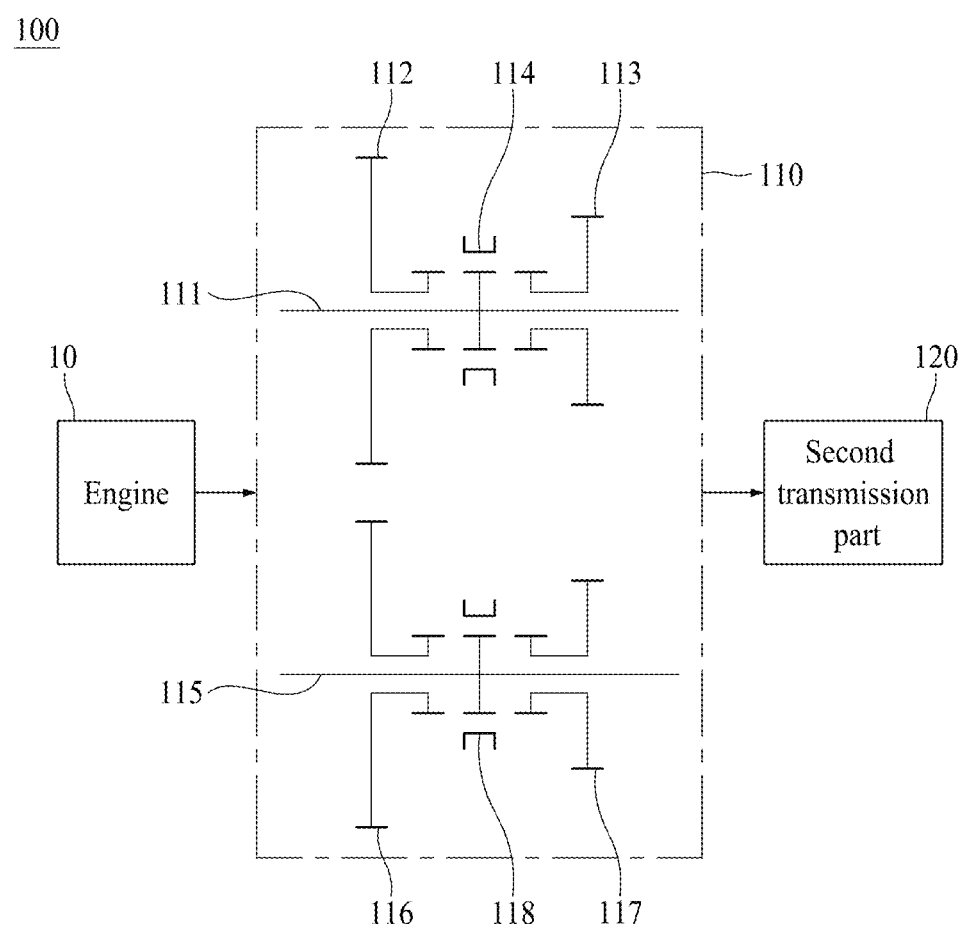
FIG. 1 is a schematic block diagram illustrating a transmission of an agricultural vehicle according to a conventional technology.
Figure 2:
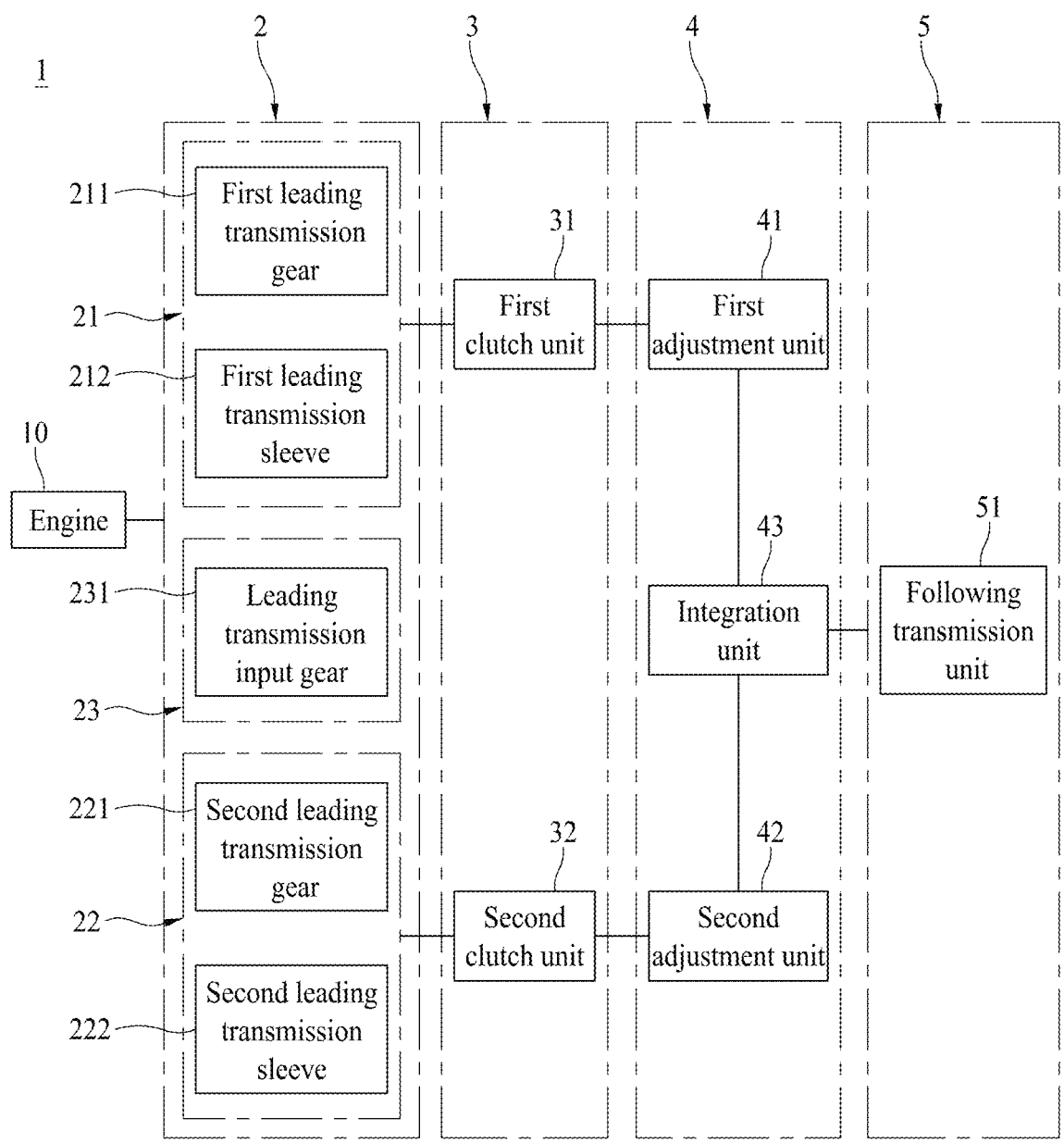
FIG. 2 is a schematic block diagram illustrating a transmission of an agricultural vehicle according to the present disclosure.

Referring to FIG. 2, a transmission apparatus 1 of an agricultural vehicle according to the present disclosure is installed on an agricultural vehicle (not shown) such as a combine, a tractor, a rice transplanter, or the like. The transmission apparatus 1 of an agricultural vehicle according to the present disclosure performs a power shift function of adjusting a torque, a speed, and the like for power transmitted from an engine 10 of the agricultural vehicle as necessary. The transmission apparatus 1 of an agricultural vehicle according to the present disclosure may include a leading transmission part 2, a clutch part 3, an adjustment part 4, and a following transmission part 5.

Figure 3:
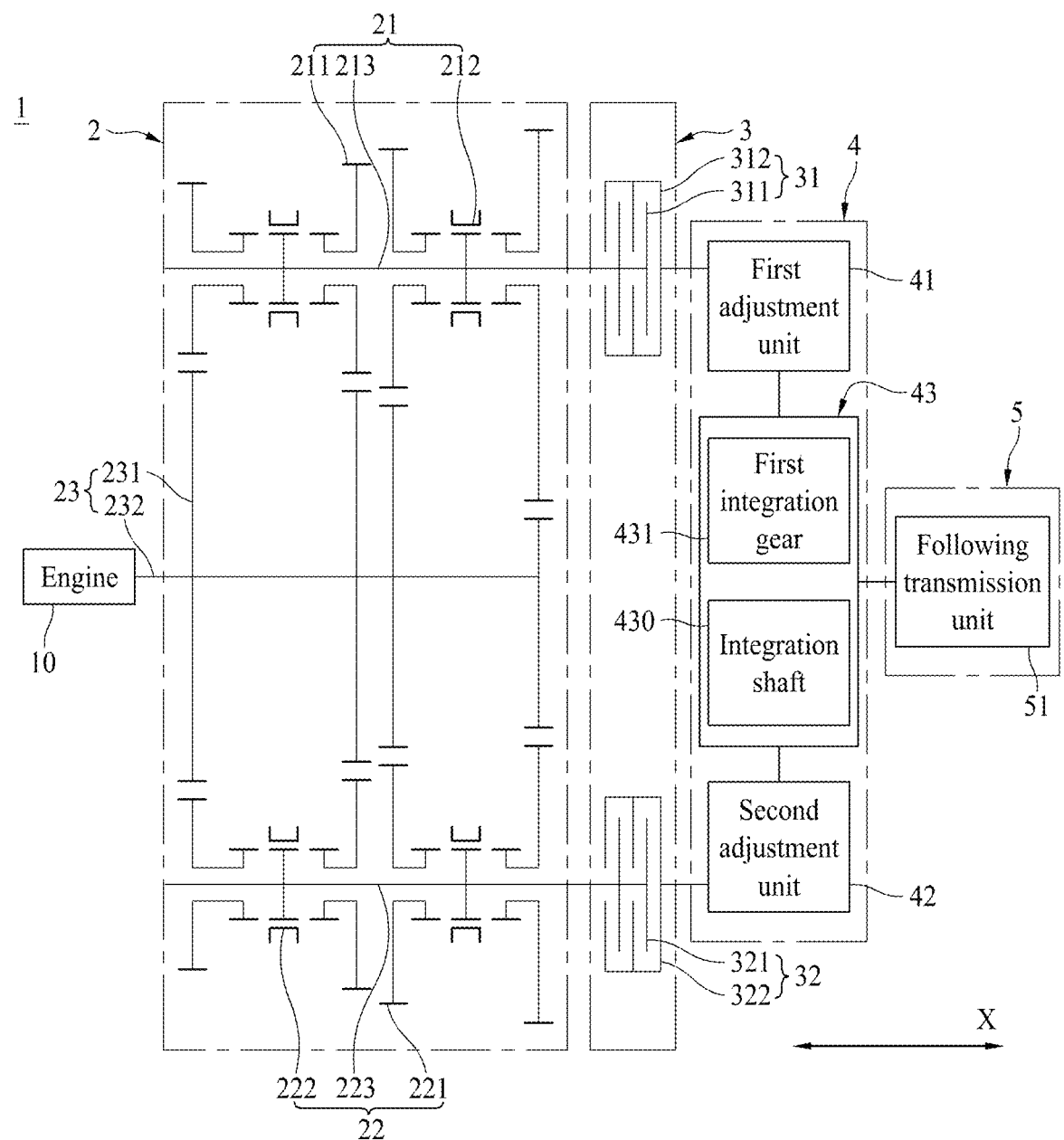
FIGS. 3 to 12 are schematic power transmission diagrams of the transmission of an agricultural vehicle according to the present disclosure.

Referring to FIGS. 2 and 3, the leading transmission part 2 shifts power transmitted from the engine 10. The leading transmission part 2 may be directly connected to the engine 10. The leading transmission part 2 may also be connected to the engine 10 through a first transmission part (not shown). In this case, the power generated by the engine 10 may be input to the leading transmission part 2 through the first transmission part. Hereinafter, the power transmitted from the engine 10 includes not only power directly transmitted from the engine 10 but also power transmitted from the engine 10 through the first transmission part. For example, the first transmission part may include a forward and backward transmission part which shifts power for forward and backward movement. The first transmission part may also include an ultra-low speed transmission part which shifts power for an ultra-low speed. A main transmission part or sub-transmission part may be implemented as the leading transmission part 2. Hereinafter, an example of an embodiment in which the main transmission part is implemented as the leading transmission part 2 will be described.

The leading transmission part 2 may include a first leading transmission unit 21 and a second leading transmission unit 22.

The first leading transmission unit 21 shifts power transmitted from the engine 10. The first leading transmission unit 21 may be connected to the clutch part 3. The power transmitted from the engine 10 may be transmitted to the clutch part 3 through the first leading transmission unit 21.

The first leading transmission unit 21 may include a plurality of first leading transmission gears 211 and a first leading transmission sleeve 212.

The first leading transmission gears 211 are rotated by the power transmitted from the engine 10. The first leading transmission gears 211 may be coupled to a first leading transmission shaft 213 to be idling. Bearings (not shown) may be installed between the first leading transmission gears 211 and the first leading transmission shaft 213. The first leading transmission gears 211 may be disposed to be spaced apart from each other in a first shaft direction (X-axis direction). The first shaft direction (X-axis direction) is a shaft direction parallel to the first leading transmission shaft 213. The first leading transmission gears 211 may be formed to have diameters that are different from each other.

The first leading transmission sleeve 212 is selectively engaged with the first leading transmission gears 211. The first leading transmission sleeve 212 may be disposed between the first leading transmission gears 211 in the first shaft direction (X-axis direction). As the first leading transmission sleeve 212 is engaged with any one of the first leading transmission gears 211, the first leading transmission sleeve 212 may enter an engagement state. As the first leading transmission sleeve 212 is separated from all the first leading transmission gears 211, the first leading transmission sleeve 212 may enter a neutral state. The first leading transmission sleeve 212 may be coupled to the first leading transmission shaft 213. Accordingly, when the first leading transmission sleeve 212 is engaged with any one of the first leading transmission gears 211, the first leading transmission sleeve 212 may rotate to rotate the first leading transmission shaft 213. When the first leading transmission sleeve 212 is separated from all the first leading transmission gears 211, even when the first leading transmission gears 211 rotate, the first leading transmission sleeve 212 and the first leading transmission shaft 213 do not rotate. The first leading transmission sleeve 212 may be a synchronizer sleeve.

The first leading transmission unit 21 may also include a plurality of first leading transmission sleeves 212 according to the number of gear stages which may be performed by the leading transmission part 2. In this case, the first leading transmission sleeves 212 may be selectively engaged with the first leading transmission gears 211 disposed at both sides thereof. The first leading transmission sleeves 212 may also be selectively engaged with the first leading transmission gears 211 disposed at one sides thereof. In the case in which the plurality of first leading transmission sleeves 212 are provided, the first leading transmission sleeves 212 may be individually moved.

The second leading transmission unit 22 shifts power transmitted from the engine 10. The second leading transmission unit 22 may be connected to the clutch part 3. The power transmitted from the engine 10 may be transmitted to the clutch part 3 through the second leading transmission unit 22.

The second leading transmission unit 22 may include a plurality of second leading transmission gears 221 and a second leading transmission sleeve 222.

The second leading transmission gears 221 are rotated by the power transmitted from the engine 10. The second leading transmission gears 221 may be coupled to a second leading transmission shaft 223 to be idling. Bearings (not shown) may be installed between the second leading transmission gears 221 and the second leading transmission shaft 223. The second leading transmission shaft 233 may be disposed to be parallel to the first shaft direction (X-axis direction). The second leading transmission gears 221 may be disposed to be spaced apart from each other in the first shaft direction (X-axis direction). The second leading transmission gears 221 may be formed to have diameters that are different from each other.

The second leading transmission sleeve 222 is selectively engaged with the second leading transmission gears 221. The second leading transmission sleeve 222 may be disposed between the second leading transmission gears 221 in the first shaft direction (X-axis direction). Due to the second leading transmission sleeve 222 being engaged with any one of the second leading transmission gears 221, the second leading transmission sleeve 222 may enter an engagement state. As the second leading transmission sleeve 222 is separated from all the second leading transmission gears 221, the second leading transmission sleeve 222 may enter a neutral state. The second leading transmission sleeve 222 may be coupled to the second leading transmission shaft 223. Accordingly, when the second leading transmission sleeve 222 is engaged with any one of the second leading transmission gears 221, the second leading transmission sleeve 222 may rotate to rotate the second leading transmission shaft 223. When the second leading transmission sleeve 222 is separated from all the second leading transmission gears 221, even when the second leading transmission gears 221 rotate, the second leading transmission sleeve 222 and the second leading transmission shaft 223 do not rotate. The second leading transmission sleeve 222 may be a synchronizer sleeve.

The second leading transmission unit 22 may also include a plurality of second leading transmission sleeves 222 according to the number of gear stages which may be performed by the leading transmission part 2. In this case, the second leading transmission sleeves 222 may be selectively engaged with the second leading transmission gears 221 disposed at both sides thereof. The second leading transmission sleeves 222 may also be selectively engaged with the second leading transmission gears 221 disposed at one sides thereof. In the case in which the plurality of second leading transmission sleeves 222 are provided, the second leading transmission sleeves 222 may be individually moved.

Referring to FIGS. 2 and 3, the leading transmission part 2 may include a leading transmission input unit 23.

The leading transmission input unit 23 transmits power transmitted from the engine 10 to each of the first leading transmission unit 21 and the second leading transmission unit 22. As the first leading transmission unit 21 and the second leading transmission unit 22 are connected to the leading transmission input unit 23, the first leading transmission unit 21 and the second leading transmission unit 22 may be connected to the engine 10 through the leading transmission input unit 23.

The leading transmission input unit 23 may include a plurality of leading transmission input gears 231.

The leading transmission input gears 231 may be engaged with the first leading transmission gears 211 and the second leading transmission gears 221. Accordingly, the leading transmission input gears 231 may be rotated by the power transmitted from the engine 10 to rotate the first leading transmission gears 211 and the second leading transmission gears 221. The leading transmission input gears 231 may be coupled to a leading transmission input shaft 232. The leading transmission input shaft 232 may be rotated by the power transmitted from the engine 10 to rotate the leading transmission input gears 231. The leading transmission input shaft 232 may be disposed to be parallel to the first shaft direction (X-axis direction). The leading transmission input gears 231 may be disposed to be spaced apart from each other in the first shaft direction (X-axis direction).

The leading transmission input gears 231 may be formed to have diameters that are different from each other. Accordingly, power may be shifted in a process in which the power is transmitted from the leading transmission input gears 231 to the first leading transmission gears 211 and the second leading transmission gears 221.

Each of the first leading transmission gears 211 may be engaged with any one of the leading transmission input gears 231 disposed at one side thereof and any one of the second leading transmission gears 221 disposed at the other side thereof. Accordingly, the leading transmission input gears 231 may rotate the first leading transmission gears 211 and the second leading transmission gears 221 at the same time.

Referring to FIGS. 2 and 3, the clutch part 3 is connected to the leading transmission part 2 to selectively output power transmitted from the leading transmission part 2. The clutch part 3 may be connected to the adjustment part 4. The clutch part 3 may selectively output the power transmitted from the leading transmission part 2 to the adjustment part 4.

The clutch part 3 may include a first clutch unit 31 and a second clutch unit 32.

The first clutch unit 31 is connected to the first leading transmission unit 21 to selectively output power transmitted from the first leading transmission unit 21. The first clutch unit 31 may selectively output the power transmitted from the first leading transmission unit 21 in a state in which the first leading transmission sleeve 212 is connected to any one of the first leading transmission gears 211. The first clutch unit 31 may be connected to the adjustment part 4. The first clutch unit 31 may selectively output the power transmitted from the first leading transmission unit 21 to the adjustment part 4. A multiple disk clutch, which selectively outputs power using friction, may be implemented as the first clutch unit 31.

The first clutch unit 31 may include a plurality of first friction members 311 and a plurality of second friction members 312.

The first friction members 311 may be coupled to the first leading transmission shaft 213. Accordingly, the first friction members 311 may rotate together with the first leading transmission shaft 213 as the first leading transmission shaft 213 rotates. The first friction members 311 may be disposed to be spaced apart from each other in the first shaft direction (X-axis direction).

The second friction members 312 may selectively come into contact with the first friction members 311. The second friction members 312 may be coupled to the adjustment part 4. When the second friction members 312 come into contact with the first friction members 311, the second friction members 312 may rotate together with the first friction members 311 as the first friction members 311 rotate. Accordingly, the power transmitted from the first leading transmission unit 21 may be output to the adjustment part 4 through the first friction members 311 and the second friction members 312. When the second friction members 312 are separated from the first friction members 311, even when the first friction members 311 rotate, the second friction members 312 do not rotate. Accordingly, the power transmitted from the first leading transmission unit 21 is not output to the adjustment part 4.

As described above, according to whether the first friction members 311 come into contact with the second friction members 312, the first clutch unit 31 may selectively output the power transmitted from the first leading transmission shaft 213. In the first clutch unit 31, the second friction members 312 may selectively come into contact with the first friction members 311 using an operation fluid such as oil. The first clutch unit 31 may supply or discharge the operation fluid according to a speed and the like of the agricultural vehicle to selectively bring the second friction members 312 into contact with the first friction members 311. The first clutch unit 31 may also selectively bring the second friction members 312 into contact with the first friction members 311 by supplying or discharging the operation fluid according to a power shift operation of a driver.

The second clutch unit 32 is connected to the second leading transmission unit 22 to selectively output power transmitted from the second leading transmission unit 22. The second clutch unit 32 may selectively output the power transmitted from the second leading transmission unit 22 in a state in which the second leading transmission sleeve 222 is engaged with any one of the second leading transmission gears 221. Accordingly, even in a state in which the first leading transmission sleeve 212 is engaged with any one of the first leading transmission gears 211, and the second leading transmission sleeve 222 is engaged with any one of the second leading transmission gears 221, the first clutch unit 31 and the second clutch unit 32 may electively output the power. In a case in which the first clutch unit 31 operates to output the power, the second clutch unit 32 operates to not output power. In this case, the first clutch unit 31 becomes an output path of the power. In a case in which the second clutch unit 32 operates to output the power, the first clutch unit 31 operates to not output power. In this case, the second clutch unit 32 becomes an output path of the power.

Accordingly, the transmission apparatus 1 of an agricultural vehicle according to the present disclosure may change a speed by changing the output path of the power using the first clutch unit 31 and the second clutch unit 32 even in the case in which both of the first leading transmission sleeve 212 and the second leading transmission sleeve 222 are in the engagement states. That is, the transmission apparatus 1 of an agricultural vehicle according to the present disclosure may change the speed without performing a process in which both the first leading transmission sleeve 212 and the second leading transmission sleeve 222 enter the neutral state. Accordingly, since the transmission apparatus 1 of an agricultural vehicle according to the present disclosure can reduce vibrations and shocks occurring in a power shift process, the transmission apparatus 1 of an agricultural vehicle can contribute to providing a stable driving environment. The second clutch unit 32 may be connected to the adjustment part 4. The second clutch unit 32 may output the power transmitted from the second leading transmission unit 22 to the adjustment part 4. A multiple disk clutch, which selectively outputs power using friction, may be implemented as the second clutch unit 32.

The second clutch unit 32 may include a plurality of third friction members 321 and a plurality of fourth friction members 322.

The third friction members 321 may be coupled to the second leading transmission shaft 223. Accordingly, the third friction members 321 may rotate together with the second leading transmission shaft 223 as the second leading transmission shaft 223 rotates. The third friction members 321 may be disposed to be spaced apart from each other in the first shaft direction (X-axis direction).

The fourth friction members 322 may selectively come into contact with the third friction members 321. The fourth friction members 322 may be coupled to the adjustment part 4. When the fourth friction members 322 come into contact with the third friction members 321, the fourth friction members 322 may rotate together with the third friction members 321 as the third friction members 321 rotate. Accordingly, the power transmitted from the second leading transmission unit 22 may be output to the adjustment part 4 through the third friction members 321 and the fourth friction members 322. When the fourth friction members 322 are separated from the third friction members 321, even when the third friction members 321 rotate, the fourth friction members 322 do not rotate. Accordingly, the power transmitted from the second leading transmission unit 22 is not output to the adjustment part 4.

As described above, according to whether the third friction members 321 come into contact with the fourth friction members 322, the second clutch unit 32 may selectively output the power transmitted from the second leading transmission shaft 223. The second clutch unit 32 may selectively bring the fourth friction members 322 into contact with the third friction members 321 using an operation fluid such as oil. In the second clutch unit 32, the fourth friction members 322 may selectively come into contact with the third friction members 321 by supplying or discharging the operation fluid according to a speed or the like of the agricultural vehicle. The second clutch unit 32 may also selectively bring the fourth friction members 322 into contact with the third friction members 321 by supplying or discharging the operation fluid according to the power shift operation of the user.

Figure 5:
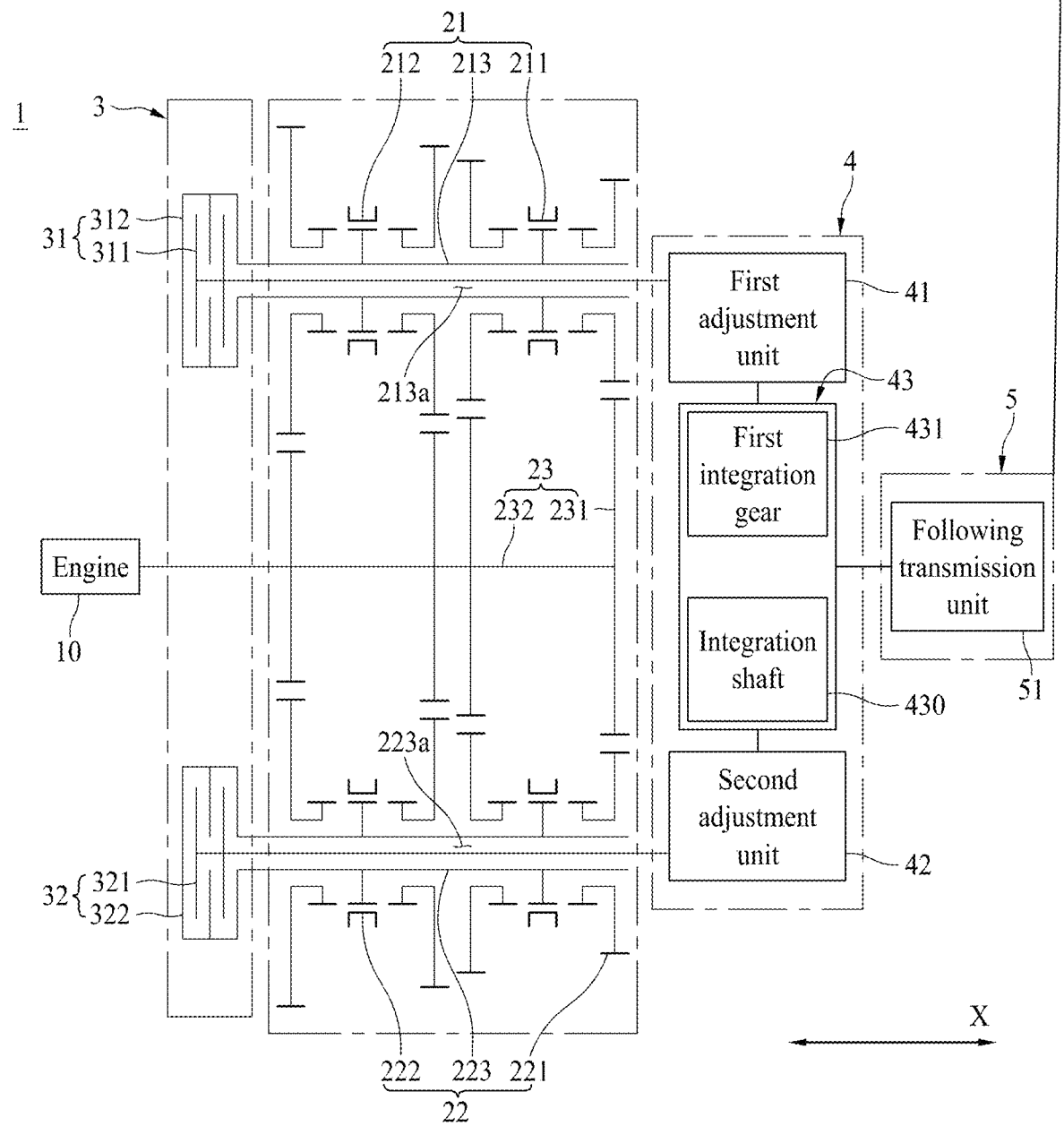
Figure 6:
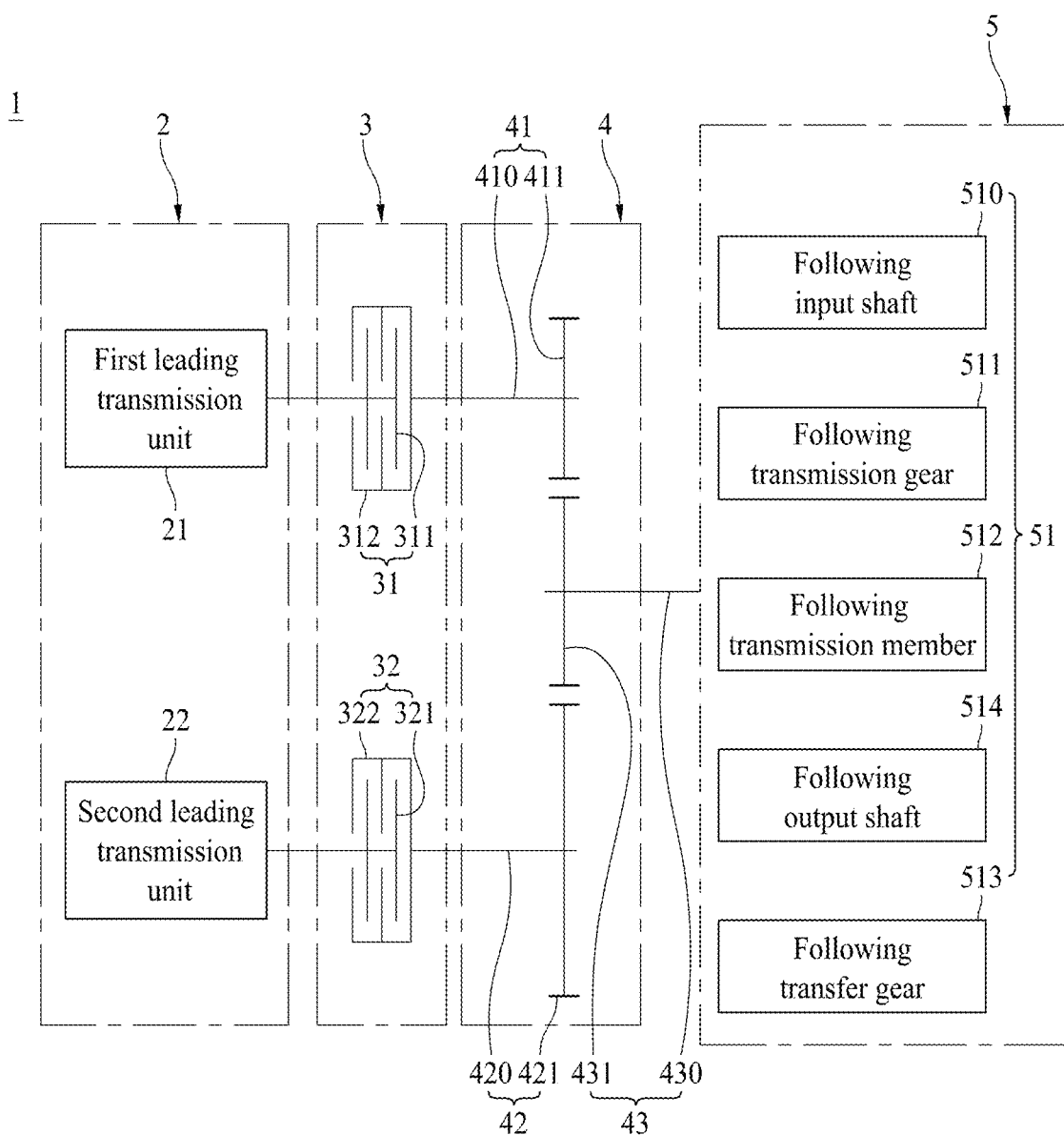

Referring to FIGS. 3 and 5, the clutch part 3 may be disposed behind the leading transmission part 2 and disposed in front the adjustment part 4 based on power transmission sequence. In this case, the clutch part 3, the leading transmission part 2, and the adjustment part 4 may be disposed as follows in the first shaft direction (X-axis direction).

First, as illustrated in FIG. 3, the clutch part 3 may be disposed between the leading transmission part 2 and the adjustment part 4 in the first shaft direction (X-axis direction). In this case, the first clutch unit 31 may be disposed between the first leading transmission unit 21 and the adjustment part 4 in the first shaft direction (X-axis direction). The second clutch unit 32 may be disposed between the second leading transmission unit 22 and the adjustment part 4 in the first shaft direction (X-axis direction).

Then, as illustrated in FIG. 5, the leading transmission part 2 may be disposed between the clutch part 3 and the adjustment part 4 in the first shaft direction (X-axis direction). In this case, the first leading transmission unit 21 may be disposed between the first clutch unit 31 and the adjustment part 4 in the first shaft direction (X-axis direction). In the case in which the first leading transmission unit 21 is disposed between the first clutch unit 31 and the adjustment part 4 in the first shaft direction (X-axis direction), a first through hole 213a may be formed in the first leading transmission shaft 213. The first through hole 213a may be formed to pass through the first leading transmission shaft 213. The first clutch unit 31 may be coupled to the adjustment part 4 using the first through hole 213a. The second leading transmission unit 22 may be disposed between the second clutch unit 32 and the adjustment part 4 in the first shaft direction (X-axis direction). In the case in which the second leading transmission unit 22 is disposed between the second clutch unit 32 and the adjustment part 4 in the first shaft direction (X-axis direction), a second through hole 223a may be formed in the second leading transmission shaft 223. The second through hole 223a may be formed to pass through the second leading transmission shaft 223. The second clutch unit 32 may be connected to the adjustment part 4 using the second through hole 223a.

Referring to FIGS. 2 to 5, the clutch part 3 may be connected to the leading transmission part 2 to output power at which a speed is reduced according to the power is shifted by the leading transmission part 2. That is, based on the power transmission sequence, the clutch part 3 is disposed behind the leading transmission part 2. The embodiment can achieve the following operational effects when compared to a comparative example in which a clutch part 3 is disposed in front of a leading transmission part 2 based on a power transmission sequence.

First, in the comparative example, since the clutch part 3 is disposed in front of the leading transmission part 2 based on the power transmission sequence, the leading transmission part 2 shifts power transmitted from the clutch part 3. Accordingly, in the comparative example, the clutch part 3 is implemented to selectively output power at which a speed is not reduced by the leading transmission part 2.

Then, in the embodiment, since the clutch part 3 is disposed behind the leading transmission part 2 based on the power transmission sequence, the clutch part 3 is implemented to selectively output power at which a speed is reduced by the leading transmission part 2. Accordingly, in the embodiment, the clutch part 3 is implemented to rotate at a slower speed to selectively output the power when compared to the comparative example. Accordingly, in the embodiment, a centrifugal hydraulic pressure can be reduced when compared to the comparative example. In addition, in the embodiment, when compared to the comparative example, in a case in which the clutch part 3 does not output power, since not only a drag torque occurring in the clutch part 3 can be reduced, but also heat generated in the clutch part 3 can be reduced, power shift efficiency can be improved.

Figure 4:
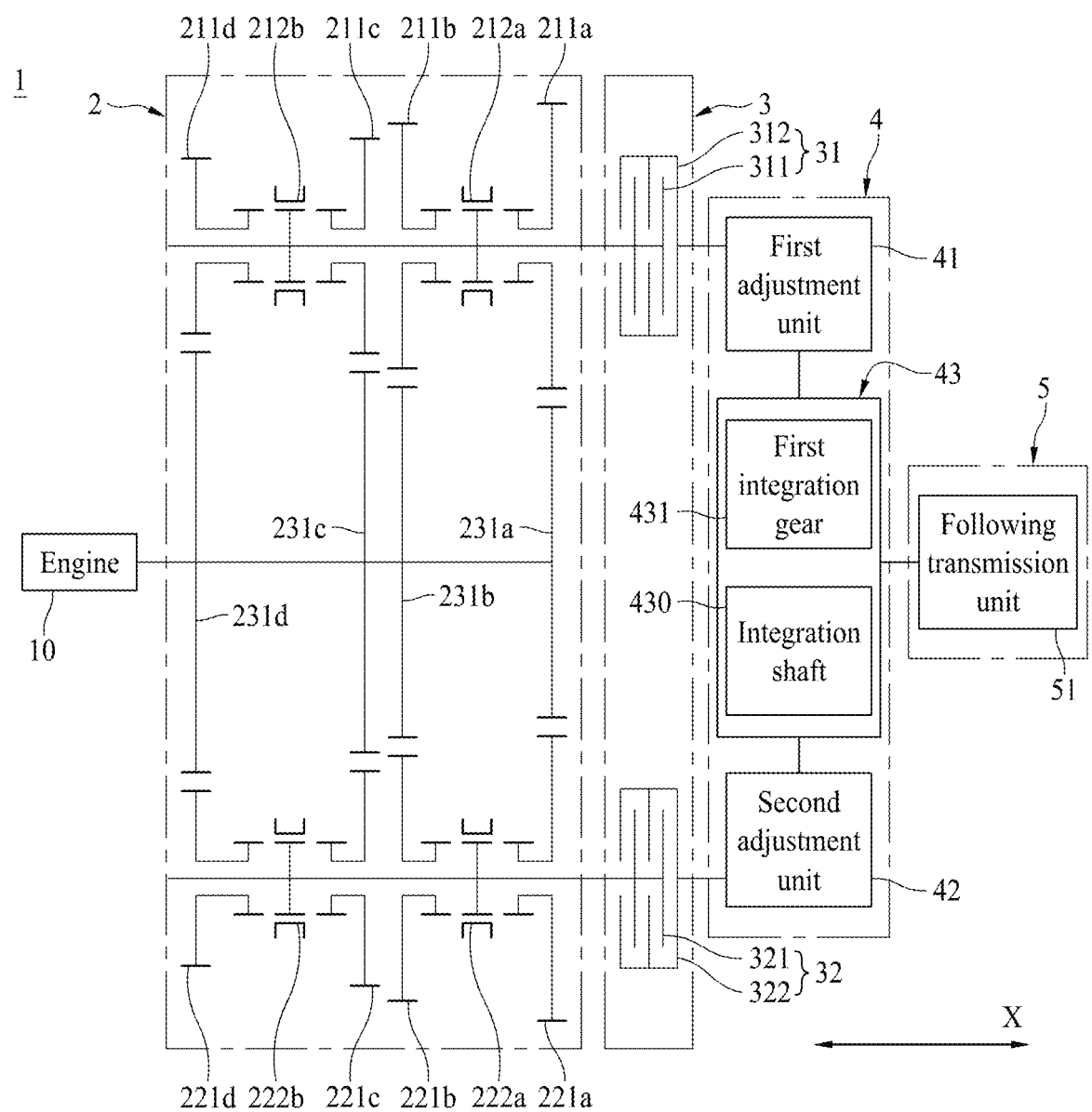

Referring to FIGS. 2 to 4, the leading transmission part 2 and the clutch part 3 may be implemented to shift power to one of eight gear stages. In this case, the first leading transmission unit 21, the second leading transmission unit 22, the leading transmission input unit 23, the first clutch unit 31, and the second clutch unit 32 may be implemented as follows.

First, the first leading transmission unit 21 may include a first leading transmission gear 211a (hereinafter, referred to as a "first stage gear 211a") corresponding to a first gear stage, a first leading transmission gear 211b (hereinafter, referred to as a "third stage gear 211b") corresponding to a third gear stage, a first leading transmission gear 211c (hereinafter, referred to as a "fifth stage gear 211c") corresponding to a fifth gear stage, a first leading transmission gear 211d (hereinafter, referred to as a "seventh stage gear 211d") corresponding to a seventh gear stage, a first leading transmission sleeve 212a (hereinafter, referred to as a "first low stage sleeve 212a") selectively engaged with the first stage gear 211a and the third stage gear 211b, and a first leading transmission sleeve 212b (hereinafter, referred to as a "first high stage sleeve 212b") selectively engaged with the fifth stage gear 211c and the seventh stage gear 211d. When the gears are sorted in order of diameter from a largest one to a smallest one, the order may be the first stage gear 211a, the third stage gear 211b, the fifth stage gear 211c, and the seventh stage gear 211d. Since the first stage gear 211a, the third stage gear 211b, the fifth stage gear 211c, and the seventh stage gear 211d are spaced apart from each other in the first shaft direction (X-axis direction), the first stage gear 211a, the third stage gear 211b, the fifth stage gear 211c, and the seventh stage gear 211d may be coupled to the first leading transmission shaft 213 to be idling. The first low stage sleeve 212a and the first high stage sleeve 212b may be coupled to the first leading transmission shaft 213 to rotate together with the first leading transmission shaft 213.

Then, the second leading transmission unit 22 may include a second leading transmission gear 221a (hereinafter, referred to as a "second stage gear 221a") corresponding to a second gear stage, a second leading transmission gear 221b (hereinafter, referred to as a "fourth stage gear 221b") corresponding to a fourth gear stage, a second leading transmission gear 221c (hereinafter, referred to as a "sixth stage gear 221c") corresponding to a sixth gear stage, a second leading transmission gear 221d (hereinafter, referred to as a "eighth stage gear 221d") corresponding to an eighth gear stage, a second leading transmission sleeve 222a (hereinafter, referred to as a "second low stage sleeve 222a") selectively engaged with the second stage gear 221a and the fourth stage gear 221b, and a second leading transmission sleeve 222b (hereinafter, referred to as a "second high stage sleeve 222b") selectively engaged with the sixth stage gear 221c and the eighth stage gear 221d. When the gears are sorted in order of diameter from a largest one to a smallest one, the order may be the second stage gear 221a, the fourth stage gear 221b, the sixth stage gear 221c, and the eighth stage gear 221d. Since the second stage gear 221a, the fourth stage gear 221b, the sixth stage gear 221c, and the eighth stage gear 221d are spaced apart from each other in the first shaft direction (X-axis direction), the second stage gear 221a, the fourth stage gear 221b, the sixth stage gear 221c, and the eighth stage gear 221d may be coupled to the second leading transmission shaft 223 to be idling. The second low stage sleeve 222a and the second high stage sleeve 222b may be coupled to the second leading transmission shaft 223 to rotate together with the second leading transmission shaft 223. The second low stage sleeve 222a, the second high stage sleeve 222b, the first low stage sleeve 212a, and the first high stage sleeve 212b may individually move.

Then, the leading transmission input unit 23 may include a first leading transmission input gear 231a engaged with the first stage gear 211a and the second stage gear 221a, a second leading transmission input gear 231b engaged with the third stage gear 211b and the fourth stage gear 221b, a third leading transmission input gear 231c engaged with the fifth stage gear 211c and the sixth stage gear 221c, and a fourth leading transmission input gear 231d engaged with the seventh stage gear 211d and the eighth stage gear 221d. When the gears are sorted in order of diameter from a largest one to a smallest one, the order may be the fourth leading transmission input gear 231d, the third leading transmission input gear 231c, the second leading transmission input gear 231b, and the first leading transmission input gear 231a. Accordingly, while power is transmitted from the first leading transmission input gear 231a to the first stage gear 211a and the second stage gear 221, a speed can be most greatly reduced. While power is transmitted from the fourth leading transmission input gear 231d to the seventh stage gear 211d and the eighth stage gear 221d, a speed can be least reduced. The first leading transmission input gear 231a, the second leading transmission input gear 231b, the third leading transmission input gear 231c, and the fourth leading transmission input gear 231d may be disposed to be spaced apart from each other in the first shaft direction (X-axis direction). The first leading transmission input gear 231a, the second leading transmission input gear 231b, the third leading transmission input gear 231c, and the fourth leading transmission input gear 231d may be coupled to the leading transmission input shaft 232 to rotate with the leading transmission input shaft 232.

Then, the first clutch unit 31 may be coupled to the first leading transmission shaft 213. The first stage gear 211a may be disposed between the first low stage sleeve 212a and the first clutch unit 31 in the first shaft direction (X-axis direction). In the case in which the embodiment illustrated in FIG. 5 is implemented, the seventh stage gear 211d may be disposed between the first clutch unit 31 and the first high stage sleeve 212b in the first shaft direction (X-axis direction).

Then, the second clutch unit 32 may be coupled to the second leading transmission shaft 223. The second stage gear 221a may be disposed between the second low stage sleeve 222a and the second clutch unit 32 in the first shaft direction (X-axis direction). In the case in which the embodiment illustrated in FIG. 5 is implemented, the eighth stage gear 221d may also be disposed between the second clutch unit 32 and the second high stage sleeve 222b in the first shaft direction (X-axis direction).

As described above, the leading transmission part 2 and the clutch part 3 may be implemented to shift power to one of eight gear stages. Although not illustrated in the drawings, the leading transmission part 2 and the clutch part 3 may also be implemented to shift power to one of the even number of gear stages such as four gear stages and six gear stages. The leading transmission part 2 and the clutch part 3 may be implemented to shift power to one of the odd number of gear stages such as three gear stages, five gear stages, and seven gear stages.

Referring to FIGS. 2 to 6, the adjustment part 4 is connected to the clutch part 3 and the following transmission part 5. The adjustment part 4 may transmit power transmitted from the clutch part 3 to the following transmission part 5.

The adjustment part 4 may include a first adjustment unit 41, a second adjustment unit 42, and an integration unit 43.

The first adjustment unit 41 is connected to the first clutch unit 31. The first adjustment unit 41 may be connected to the first clutch unit 31 and the integration unit 43. Accordingly, the first adjustment unit 41 may transmit power transmitted from the first clutch unit 31 to the integration unit 43.

The first adjustment unit 41 may include a first adjustment gear 411.

The first adjustment gear 411 is rotated by the power transmitted from the first clutch unit 31. The first adjustment gear 411 may be connected to the integration unit 43. Accordingly, the first adjustment gear 411 may transmit the power transmitted from the first clutch unit 31 to the integration unit 43.

The first adjustment gear 411 may be coupled to a first adjustment shaft 410. The first adjustment shaft 410 is coupled to the first clutch unit 31. In a case in which the first clutch unit 31 outputs power transmitted from the first leading transmission unit 21, the first adjustment shaft 410 may be rotated by the power transmitted from the first clutch unit 31 to rotate the first adjustment gear 411. The first adjustment shaft 410 may be disposed to be parallel to the first shaft direction (X-axis direction).

The second adjustment unit 42 is connected to the second clutch unit 32. The second adjustment unit 42 may be connected to the second clutch unit 32 and the integration unit 43. Accordingly, the second adjustment unit 42 may transmit power transmitted from the second clutch unit 32 to the integration unit 43.

The second adjustment unit 42 may include a second adjustment gear 421.

The second adjustment gear 421 is rotated by the power transmitted from the second clutch unit 32. The second adjustment gear 421 may be connected to the integration unit 43. Accordingly, the second adjustment gear 421 may transmit the power transmitted from the second clutch unit 32 to the integration unit 43.

The second adjustment gear 421 may be coupled to a second adjustment shaft 420. The second adjustment shaft 420 is coupled to the second clutch unit 32. In a case in which the second clutch unit 32 outputs power transmitted from the second leading transmission unit 22, the second adjustment shaft 420 may be rotated by the power transmitted from the second clutch unit 32 to rotate the second adjustment gear 421. The second adjustment shaft 420 may be disposed to be parallel to the first shaft direction (X-axis direction).

The integration unit 43 is connected to both the first adjustment unit 41 and the second adjustment unit 42. The integration unit 43 may be connected to the following transmission part 5. Accordingly, in a case in which the first clutch unit 31 operates to output power, power shifted by the first leading transmission unit 21 may be transmitted to the following transmission part 5 through the first clutch unit 31, the first adjustment unit 41, and the integration unit 43. In a case in which the second clutch unit 32 outputs power, power shifted by the second leading transmission unit 22 may be transmitted to the following transmission part 5 through the second clutch unit 32, the second adjustment unit 42, and the integration unit 43.

The integration unit 43 may be connected to the first adjustment unit 41 to shift power at a first gear ratio and may be connected to the second adjustment unit 42 to shift power at a second gear ratio different from the first gear ratio. Accordingly, even when the first leading transmission unit 21 and the second leading transmission unit 22 are implemented to shift power at the same gear shift ratio, the integration unit 43 may output power at different speeds according to which power is transmitted from the first adjustment gear 411 and the second adjustment gear 421. Accordingly, in the transmission apparatus 1 of an agricultural vehicle according to the present disclosure, even when the first leading transmission unit 21 and the second leading transmission unit 22 are implemented to be the same, the power may be output at the different speeds according to which power is transmitted to the integration unit 43 through the first adjustment unit 41 and the second adjustment unit 42. Accordingly, in the transmission apparatus 1 of an agricultural vehicle according to the present disclosure, the first leading transmission unit 21 and the second leading transmission unit 22 can be shared or modularized. Accordingly, the transmission apparatus 1 of an agricultural vehicle according to the present disclosure can improve ease of manufacturing the first leading transmission unit 21 and the second leading transmission unit 22 and contribute to reducing a manufacturing cost.

In the case in which the first leading transmission unit 21 and the second leading transmission unit 22 are implemented to shift power at the same gear shift ratio, the first leading transmission gear 211 and the second leading transmission gear 221 engaged with one side and the other side of the leading transmission input gears 231 may be formed to be the same to shift power at the same gear shift ratio. For example, a gear shift ratio between the first stage gear 211a and the first leading transmission input gear 231a may be the same as a gear shift ratio between the second stage gear 221a and the first leading transmission input gear 231a. A gear shift ratio between the third stage gear 211b and the second leading transmission input gear 231b may be the same as a gear shift ratio between the fourth stage gear 221b and the second leading transmission input gear 231b. A gear shift ratio between the fifth stage gear 211c and the third leading transmission input gear 231c may be the same as a gear shift ratio between the sixth stage gear 221c and the third leading transmission input gear 231c. A gear shift ratio between the seventh stage gear 211d and the fourth leading transmission input gear 231d may be the same as a gear shift ratio between the eighth stage gear 221d and the fourth leading transmission input gear 231d. The first stage gear 211a may be formed to be the same as the second stage gear 221a, the third stage gear 211b may be formed to be the same as the fourth stage gear 221b, the fifth stage gear 211c may be formed to be the same as the sixth stage gear 221c, and the seventh stage gear 211d may be formed to be the same as the eighth stage gear 221d.

The integration unit 43 may include a first integration gear 431.

The first integration gear 431 may be engaged with the first adjustment gear 411 and the second adjustment gear 421. In a process in which power is transmitted from the first adjustment gear 411 to the first integration gear 431, the power may be shifted at the first gear ratio. In a process in which power is transmitted from the second adjustment gear 421 to the first integration gear 431, the power may be shifted at the second gear ratio. The first integration gear 431 may be coupled to an integration shaft 430. When power is transmitted from the first adjustment gear 411 or the second adjustment gear 421 to the first integration gear 431, the first integration gear 431 may rotate to rotate the integration shaft 430. Accordingly, the power shifted at the first gear ratio or the second gear ratio may be output through the integration shaft 430. The integration shaft 430 may be disposed to be parallel to the first shaft direction (X-axis direction).

Referring to FIGS. 2 to 8, the following transmission part 5 shifts power transmitted from the adjustment part 4. The following transmission part 5 may be connected to a distribution gear 20. The following transmission part 5 may also be directly connected to the distribution gear 20 or may also be connected to the distribution gear 20 through a second transmission part (not shown). A main transmission part or sub-transmission part may be implemented as the following transmission part 5. Hereinafter, an example of the embodiment in which the sub-transmission part is implemented as the following transmission part 5 will be described.

The following transmission part 5 may include one following transmission unit 51.

The following transmission unit 51 may be connected to both the first adjustment unit 41 and the second adjustment unit 42 through the integration unit 43. Accordingly, in a case in which the first clutch unit 31 operates to output power, the following transmission unit 51 may receive power shifted by the first leading transmission unit 21 through the first clutch unit 31, the first adjustment shaft 410, the first adjustment gear 411, the first integration gear 431, and the integration shaft 430 and may further shift the power. In a case in which the second clutch unit 32 outputs power, the following transmission unit 51 may receive power shifted by the second leading transmission unit 22 through the second clutch unit 32, the second adjustment shaft 420, the second adjustment gear 421, the first integration gear 431, and the integration shaft 430 and may further shift the power. That is, the following transmission unit 51 may selectively receive the power shifted by the first leading transmission unit 21 and the power shifted by the second leading transmission unit 22 according to the operation of the clutch part 3 and may further shift the power.

Accordingly, the transmission apparatus 1 of an agricultural vehicle according to the present disclosure is implemented to further shift the power shifted by the first leading transmission unit 21 and the power shifted by the second leading transmission unit 22 using the one following transmission unit 51. Accordingly, since the transmission apparatus 1 of an agricultural vehicle according to the present disclosure can improve ease of manufacturing the following transmission part 5 and reduce a material cost of the following transmission part 5, a manufacturing cost of the following transmission part 5 can be reduced when compared to the comparative example in which a following transmission part 5 includes a plurality of following transmission units.

In addition, since revolutions per minute (RPM) are reduced, and a torque is increased, as power is transmitted in a rearward direction based on the power transmission sequence, power having a larger torque is transmitted to the following transmission part 5 when compared to the leading transmission part 2. Accordingly, since thicknesses, strengths, and the like of the gears included in the following transmission part 5 need to be secured, a material cost is increased. In this case, in the transmission apparatus 1 of an agricultural vehicle according to the present disclosure, the following transmission part 5 is implemented to further shift power using the one following transmission unit 51. Accordingly, since the transmission apparatus 1 of an agricultural vehicle according to the present disclosure may be implemented with a lower total cost, the transmission apparatus 1 of an agricultural vehicle according to the present disclosure can be implemented with a lower total manufacturing cost when compared to the comparative example in which the leading transmission part 2 includes one leading transmission unit, and the following transmission part 5 includes the plurality of following transmission units.

The following transmission unit 51 may include a following input shaft 510. The following input shaft 510 may be connected to the adjustment part 4. The following transmission unit 51 may be directly connected to the adjustment part 4 through the following input shaft 510 and the integration shaft 430. In this case, the following input shaft 510 may be connected to the integration shaft 430. The following input shaft 510 may also be directly coupled to the integration shaft 430. The following transmission unit 51 may receive power from the integration unit 43 through the following input shaft 510 and the integration shaft 430. The following input shaft 510 may be disposed to be parallel to the first shaft direction (X-axis direction).

In this case, the following transmission unit 51 may be implemented to have one of various embodiments. The embodiments will be described with reference to the accompanying drawings one by one.

<Following Transmission Unit 51 According to First Embodiment>

Figure 7:
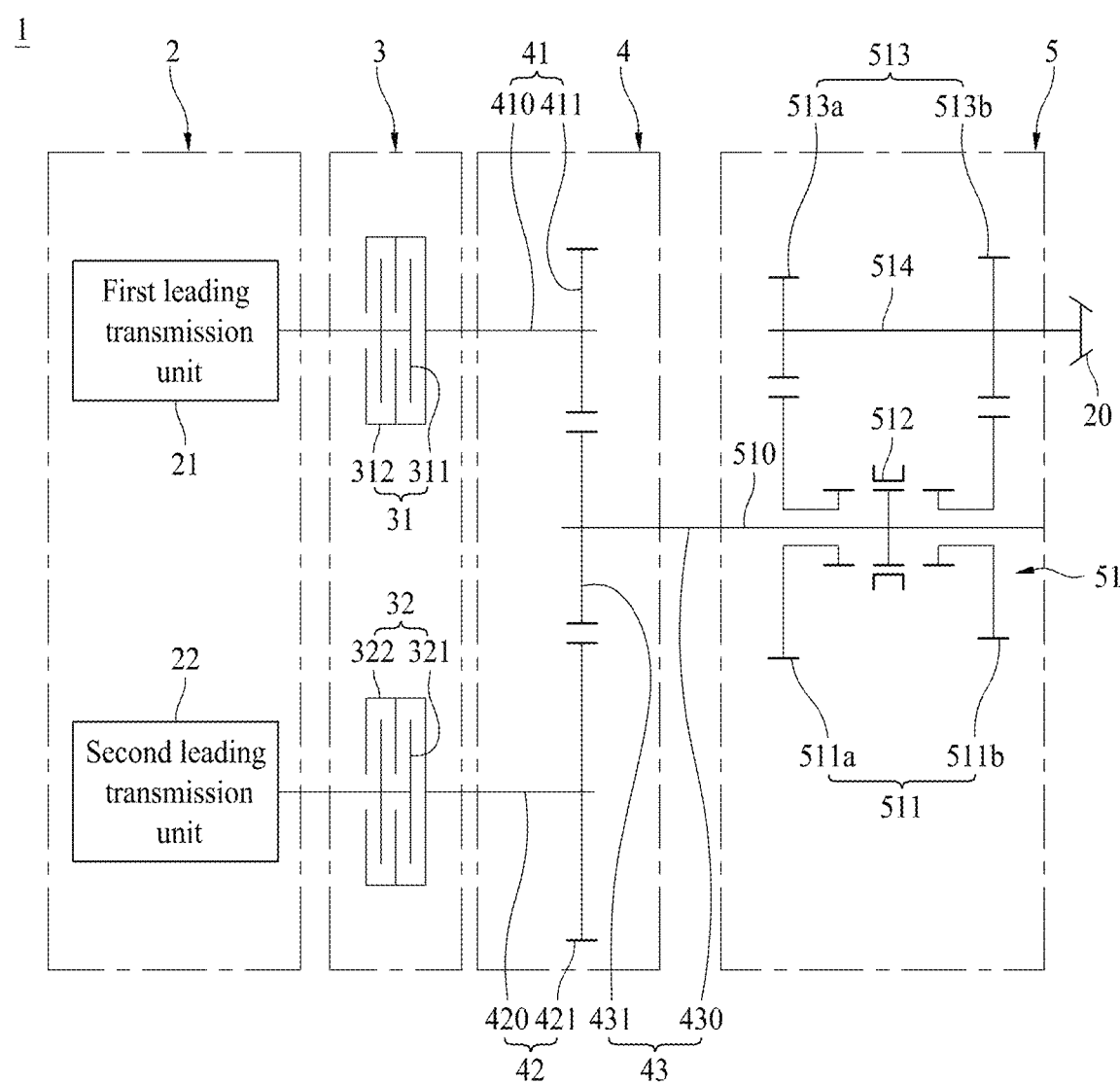

Referring to FIG. 7, a following transmission unit 51 according to a first embodiment may include a plurality of following transmission gears 511, a following transmission member 512, a plurality of following transfer gears 513, and a following output shaft 514.

The following transmission gears 511 are coupled to a following input shaft 510 to be idling. The following transmission gears 511 may be disposed to be spaced apart from each other in a first shaft direction (X-axis direction). Bearings (not shown) may be disposed between the following transmission gears 511 and the following input shaft 510. The following transmission gears 511 may be formed to have diameters that are different from each other.

The following transmission member 512 is selectively connected to the following transmission gears 511. A sleeve or hydraulic clutch may be implemented as the following transmission member 512. Hereinafter, although the embodiment, in which the sleeve is implemented as the following transmission member 512 as illustrated in FIGS. 7, 8, 11, and 12, will be described, an embodiment, in which the hydraulic clutch is implemented as the following transmission member 512, will be clearly derived by the skilled in the art. The following transmission member 512 may be disposed between the following transmission gears 511 in the first shaft direction (X-axis direction). As the following transmission member 512 is engaged with any one of the following transmission gears 511, the following transmission member 512 may enter an engagement state. As the following transmission member 512 is spaced apart from all the following transmission members 511, the following transmission member 512 may enter a neutral state. The following transmission member 512 may be coupled to the following input shaft 510.

The following transfer gears 513 are engaged with the following transmission gears 511. The following transfer gears 513 may be coupled to the following output shaft 514. The following transfer gears 513 may be disposed to be spaced apart from each other in the first shaft direction (X-axis direction). The following transfer gears 513 may be formed to have diameters that are different from each other.

The following output shaft 514 is disposed to be spaced apart from the following input shaft 510 to be parallel to the first shaft direction (X-axis direction). The following output shaft 514 may be coupled to the following transfer gears 513. The following output shaft 514 may be connected to a distribution gear 20. When the following transmission member 512 is engaged with any one of the following transmission gears 511, power transmitted through the integration shaft 430 may be transmitted to the distribution gear 20 through the following input shaft 510, the following transmission member 512, any one of the following transmission gears 511, any one of the following transfer gears 513, and the following output shaft 514.

In a case in which the following transmission unit 51 shifts power to a second stage, the following transmission unit 51 may include a first following transmission gear 511a and a second following transmission gear 511b which are disposed at both sides of the following transmission member 512, a first following transfer gear 513a engaged with the first following transmission gear 511a, and a second following transfer gear 513b engaged with the second following transmission gear 511b.

When the following transmission member 512 is engaged with the first following transmission gear 511a, the power transmitted through the integration shaft 430 may be transmitted to the distribution gear 20 through the following input shaft 510, the following transmission member 512, the first following transmission gear 511a, the first following transfer gear 513a, and the following output shaft 514.

When the following transmission member 512 is engaged with the second following transmission gear 511b, the power transmitted through the integration shaft 430 may be transmitted to the distribution gear 20 through the following input shaft 510, the following transmission member 512, the second following transmission gear 511b, the second following transfer gear 513b, and the following output shaft 514.

Although not illustrated in the drawing, the following transmission unit 51 according to the first embodiment may also be implemented to shift power to a third gear stage or higher gear stage.

<Following Transmission Unit 51 According to Second Embodiment>

Figure 8:
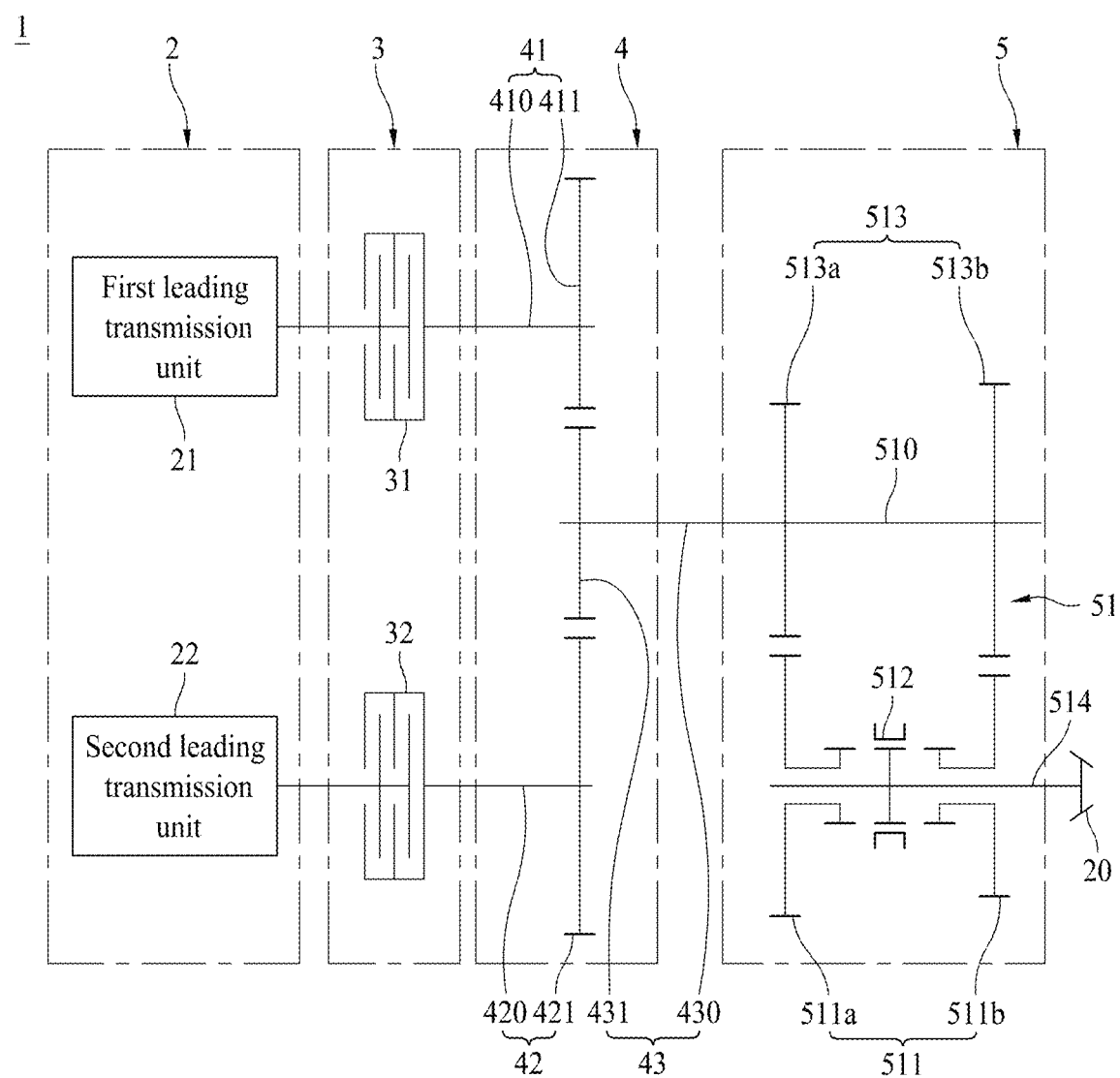
Figure 9:
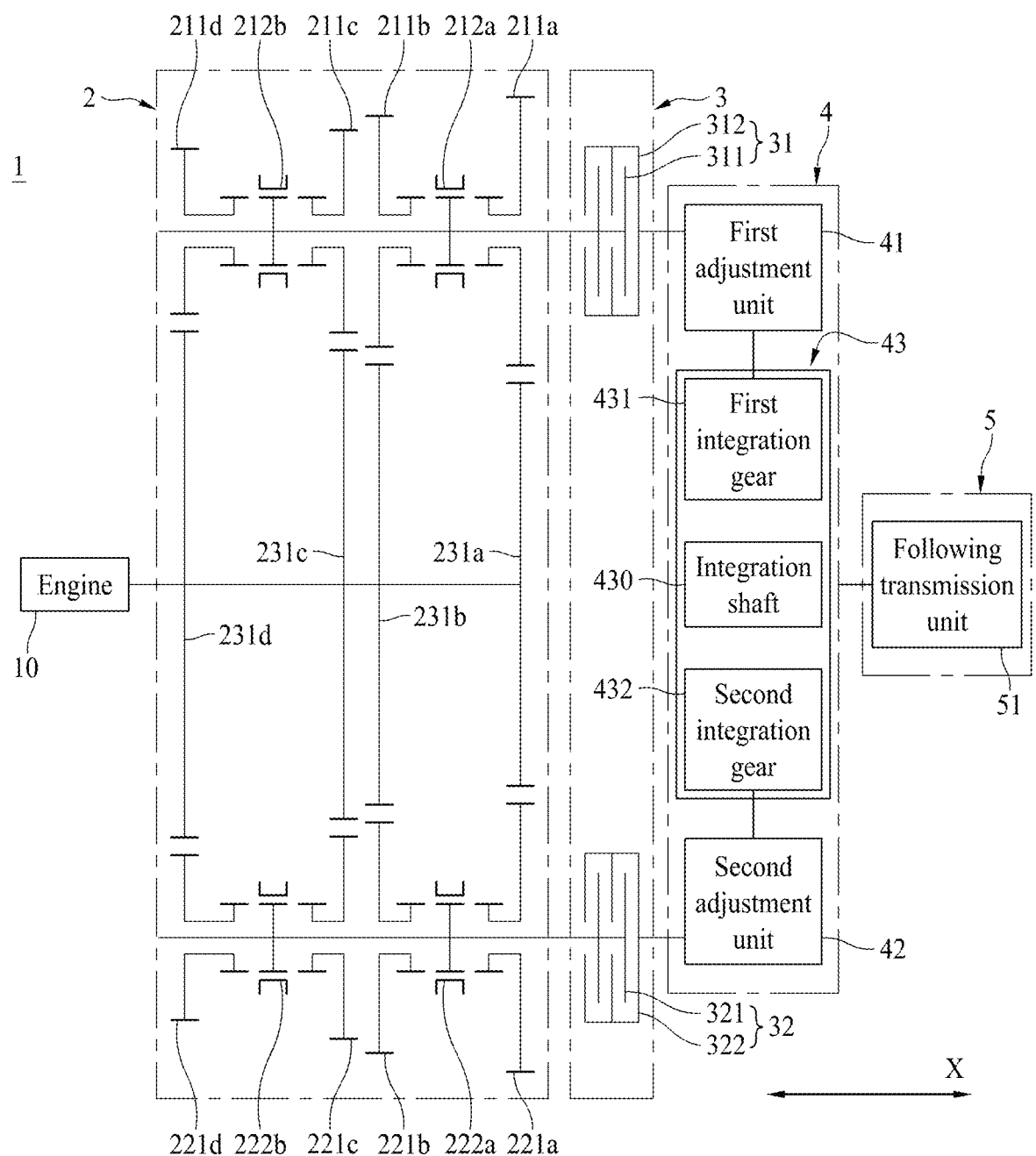
Figure 10:
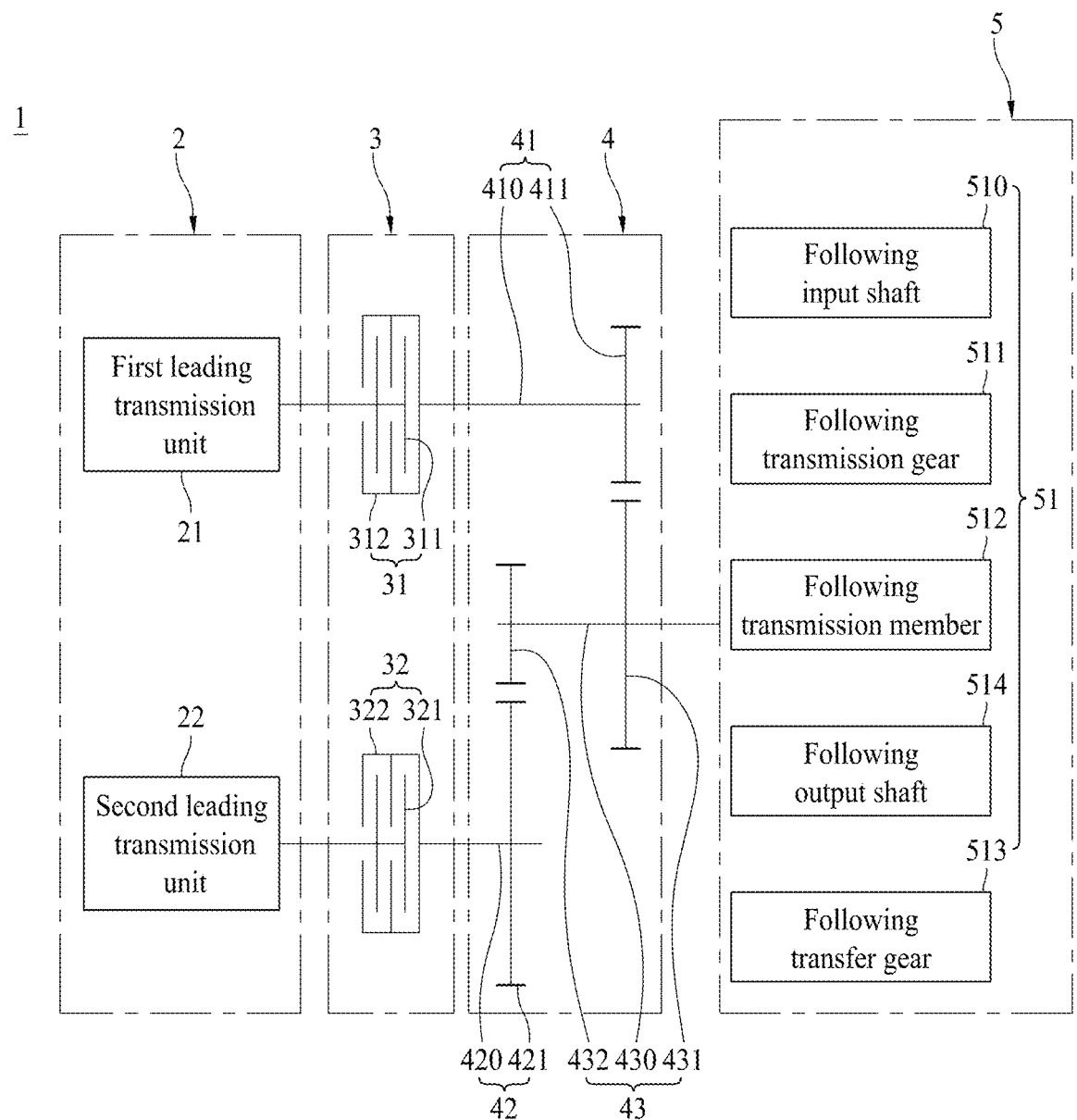

Referring to FIG. 8, a following transmission unit 51 according to a second embodiment differs from the above-described first embodiment in that following transmission gears 511 and a following transmission member 512 are coupled to a following output shaft 514, and following transfer gears 513 are coupled to a following input shaft 510 when compared thereto.

The following transmission gears 511 may be coupled to the following output shaft 514 to be idling. The following transmission member 512 may be coupled to the following output shaft 514 to be selectively connectable to the following transmission gears 511.

The following transfer gears 513 may be engaged with the following transmission gears 511. The following transfer gears 513 may be coupled to the following input shaft 510. Power transmitted through an integration shaft 430 may be transmitted to the following transfer gears 513 through the following input shaft 510 and transmitted from the following transfer gears 513 to the following transmission gears 511. In this case, when the following transmission member 512 is engaged with any one of the following transmission gears 511, the following transmission member 512 may rotate to transfer power to a distribution gear 20 through the following output shaft 514. The following transfer gears 513 may be formed to have diameters that are different from each other.

In a case in which the following transmission unit 51 shifts power to a second gear stage, the following transmission unit 51 may include a first following transmission gear 511a and a second following transmission gear 511b which are disposed at both sides of the following transmission member 512, a first following transfer gear 513a engaged with the first following transmission gear 511a, and a second following transfer gear 513b engaged with the second following transmission gear 511b.

When the following transmission member 512 is engaged with the first following transmission gear 511a, the power transmitted through the integration shaft 430 may be transmitted to the distribution gear 20 through the following input shaft 510, the first following transfer gear 513a, the first following transmission gear 511a, the following transmission member 512, and the following output shaft 514.

When the following transmission member 512 is engaged with the second following transmission gear 511b, the power transmitted through the integration shaft 430 may be transmitted to the distribution gear 20 through the following input shaft 510, the second following transfer gear 513b, the second following transmission gear 511b, the following transmission member 512, and the following output shaft 514.

As described above, in the following transmission unit 51 according to the first embodiment and the following transmission unit 52 according to the second embodiment, the following transmission gears 511 may be coupled to any one of the following input shaft 510 and the following output shaft 514 to be idling, the following transmission member 512 may be coupled to a shaft, to which the following transmission gears 511 are coupled, among the following input shaft 510 and the following output shaft 514, and the following transfer gears 513 may be coupled to the remaining shaft, which is not the shaft, to which the following transmission gears 511 are coupled, among the following input shaft 510 and the following output shaft 514. Although not illustrated in the drawing, the following transmission unit 51 according to the second embodiment may be implemented to shift power to a third gear stage or higher gear stage.

Referring to FIGS. 9 to 12, in the transmission apparatus 1 of an agricultural vehicle according to the present disclosure, the integration unit 43 may include a second integration gear 432 in addition to the first integration gear 431 and the integration shaft 430.

The first integration gear 431 is connected to the first adjustment unit 41 to shift power at the first gear ratio. The first integration gear 431 may be coupled to the integration shaft 430. The first integration gear 431 may be engaged with the first adjustment gear 411. In a case in which the first clutch unit 31 operates to output power, the power, which is shifted while the power is transferred through the first adjustment gear 411 and the first integration gear 431, may be transmitted to the following transmission part 5 through the integration shaft 430.

The second integration gear 432 is connected to the second adjustment unit 42 to shift power at the second gear ratio. The second integration gear 432 may be coupled to the integration shaft 430. The second integration gear 432 may be engaged with the second adjustment gear 421. In a case in which the second clutch unit 32 operates to output power, the power, which is shifted while the power is transmitted through the second adjustment gear 421 and the second integration gear 432, may be transmitted to the following transmission part 5 through the integration shaft 430.

The second integration gear 432 and the first integration gear 431 may be disposed at positions spaced apart from each other. The second integration gear 432 and the first integration gear 431 may be formed to have diameters that are different from each other. In this case, the second adjustment gear 421 and the first adjustment gear 411 may be formed to have diameters that are different from each other.

The integration shaft 430 is rotated by power transmitted from any one of the first integration gear 431 and the second integration gear 432. The integration shaft 430 may be coupled to the first integration gear 431 and the second integration gear 432. The integration shaft 430 may be connected to the following transmission part 5.

As described above, since the integration unit 43 is implemented to include the second integration gear 432 in addition to the first integration gear 431 and the integration shaft 430, the transmission apparatus 1 of an agricultural vehicle according to the present disclosure can achieve operational effects below.

In the transmission apparatus 1 of an agricultural vehicle according to the present disclosure, since the first adjustment gear 411 and the second adjustment gear 412 can also be shared or modularized, a range of sharing or modulization can be increased. In this case, the first adjustment gear 411 and the second adjustment gear 421 may be formed to have the same diameter. Accordingly, in the transmission apparatus 1 of an agricultural vehicle according to the present disclosure, convenience in assembly can be improved, and a manufacturing cost can be further reduced by reducing a material cost. Meanwhile, in the case in which the first adjustment gear 411 and the second adjustment gear 412 are formed to have the same diameter, a difference between the first gear ratio and the second gear ratio may be achieved through a difference in diameter between the first integration gear 431 and the second integration gear 432.

Figure 13:
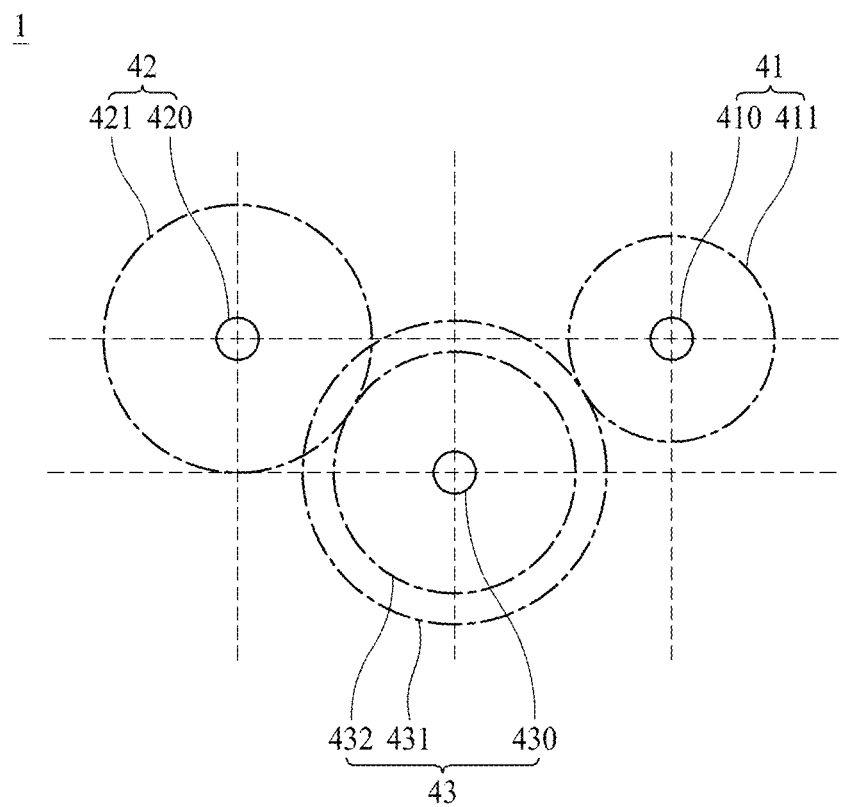
FIG. 13 is a schematic view for describing a layout of a first adjustment gear, a second adjustment gear, a first integration gear, and a second integration gear in the transmission of an agricultural vehicle according to the present disclosure.

In the transmission apparatus 1 of an agricultural vehicle according to the present disclosure, the integration shaft 430 may be disposed at a central portion of a transmission case (not shown) by adjusting the diameters of the first adjustment gear 411, the second adjustment gear 412, the first integration gear 431, and the second integration gear 432. In this case, as illustrated in FIG. 13, a first diameter value which is the sum of the diameter of the first adjustment gear 411 and the diameter of the first integration gear 431 may be the same as a second diameter value which is the sum of the diameter of the second adjustment gear 421 and the diameter of the second integration gear 432. Accordingly, a first distance between the first adjustment shaft 410 and the integration shaft 430 may be the same as a second distance between the second adjustment shaft 420 and the integration shaft 430. Accordingly, the first leading transmission unit 21, the second leading transmission unit 22, the first clutch unit 31, the second clutch unit 32, the first adjustment unit 41, the second adjustment unit 42, and the integration unit 43 may be disposed to improve an overall balance in the transmission case. Accordingly, in the transmission apparatus 1 of an agricultural vehicle according to the present disclosure, a balance of an overall layout for shifting the gear can be improved. Each of the first distance and the second distance may denote a shortest distance connecting two shafts in a straight line.

Figure 11:
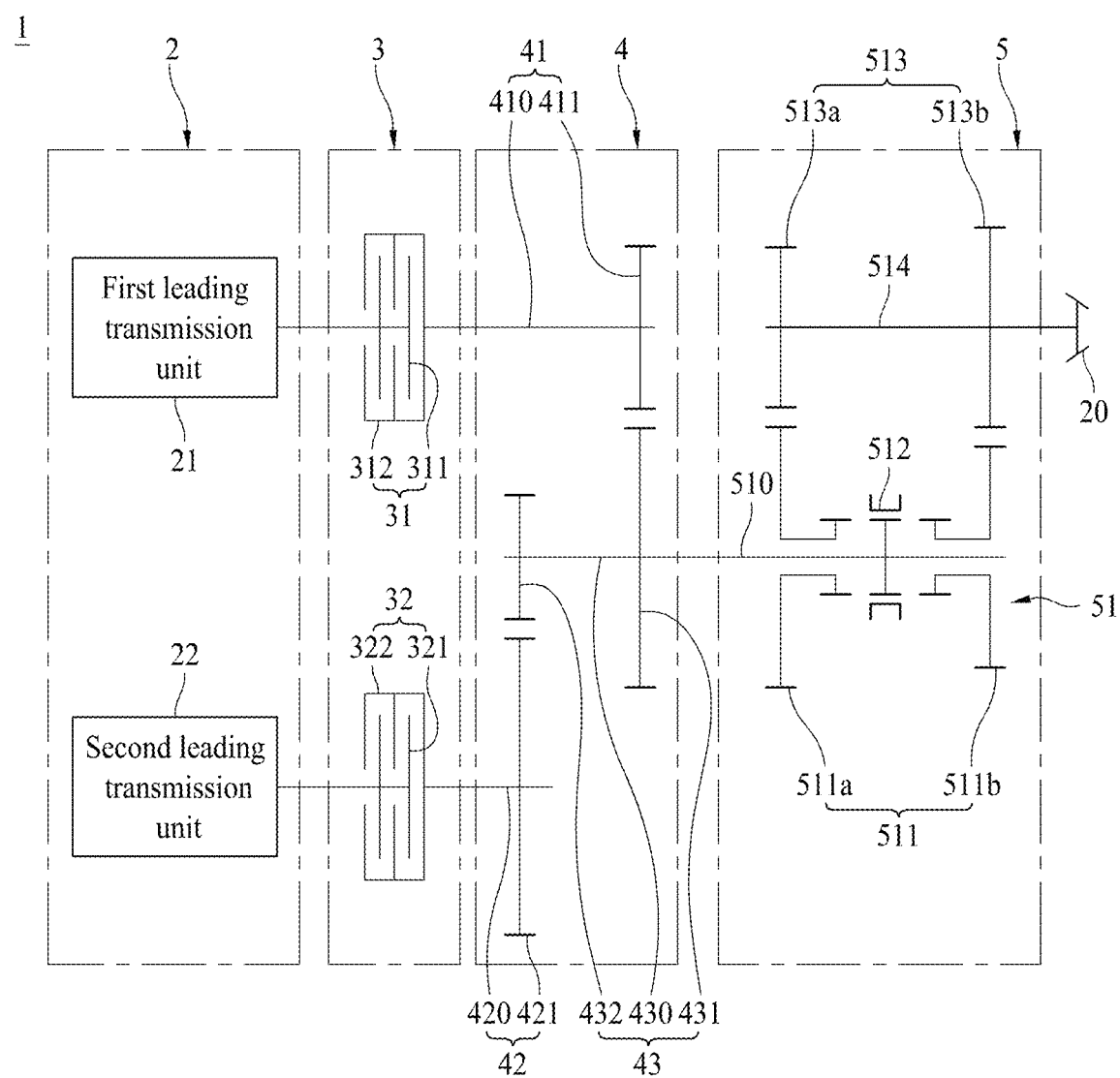
Figure 12:
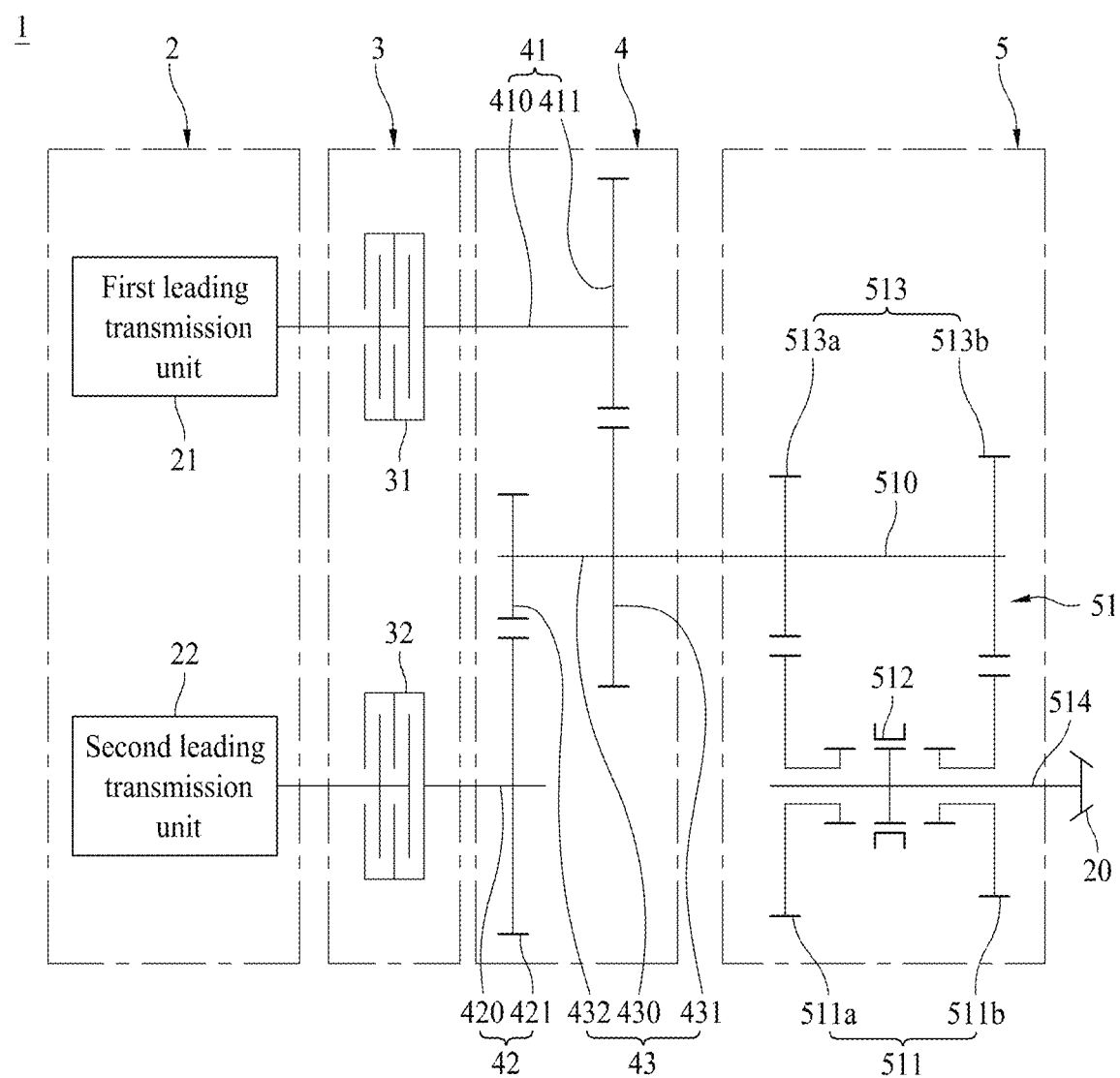

As illustrated in FIG. 11, the integration shaft 430 may be connected to the following transmission unit 51 according to the first embodiment. As illustrated in FIG. 12, the integration shaft 430 may be connected to the following transmission unit 51 according to the second embodiment. The following transmission unit 51 according to the first embodiment or the second embodiment may be implemented so that the following input shaft 510 is directly coupled to the integration shaft 430.

Referring to FIGS. 14 to 17, a transmission apparatus 1 of an agricultural vehicle according to a modified embodiment of the present disclosure may include a transfer part 6. Unlike the above-described transmission apparatus 1 of an agricultural vehicle according to the present disclosure in which the adjustment part 4 is directly connected to the following transmission unit 51, in the transmission apparatus 1 of an agricultural vehicle according to the modified embodiment of the present disclosure, an adjustment part 4 may be implemented to be connected to a following transmission unit 51 through the transfer part 6.

The transfer part 6 may be connected to an integration unit 43 and a following transmission unit 51. Accordingly, the transfer part 6 may receive power from the integration unit 43 and transfer the power to the following transmission unit 51. As the transfer part 6 is connected to the following input shaft 510, the transfer part 6 may be connected to the following transmission unit 51. As the transfer part 6 is connected to an integration shaft 430, the transfer part 6 may be connected to the integration unit 43. The transfer part 6 may be disposed between the integration unit 43 and the following transmission unit 51.

The transfer part 6 may include a transfer output gear 61 and a transfer input gear 62.

The transfer output gear 61 is connected to the following transmission unit 51. The transfer output gear 61 may be coupled to a following input shaft 510. Accordingly, the transfer output gear 61 may be connected to the following transmission unit 51 through the following input shaft 510.

The transfer input gear 62 is connected to the integration unit 43. The transfer input gear 62 may be coupled to the integration shaft 430. Accordingly, the transfer input gear 62 may be connected to the integration unit 43 through the integration shaft 430. Accordingly, the transfer input gear 62 may be connected to the adjustment part 4. The transfer input gear 61 may be engaged with the transfer output gear 61. Accordingly, power transmitted through the integration shaft 430 may be transmitted to the following transmission unit 51 through the transfer input gear 62, the transfer output gear 61, and the following input shaft 510. In a process in which the power is transmitted from a transfer input gear 56 to the transfer output gear 61, power may also be further shifted at a gear ratio between the transfer input gear 56 and the transfer output gear 61. In this case, the transfer input gear 56 and the transfer output gear 61 may be formed to have diameters that are different from each other.

Figure 14:
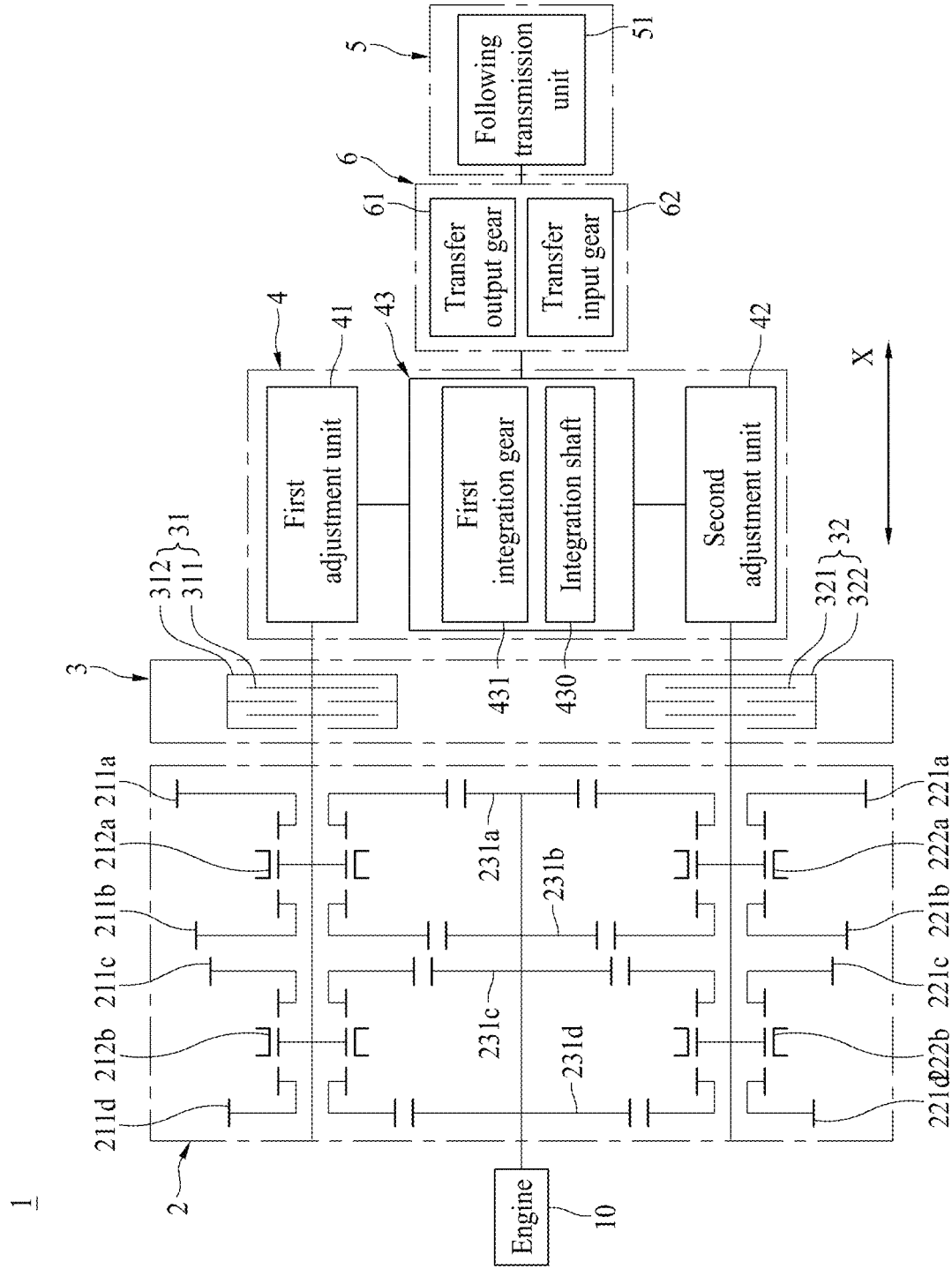
FIGS. 14 to 17 are schematic power transmission diagrams of a transmission of an agricultural vehicle according to a modified embodiment of the present disclosure.
Figure 15:
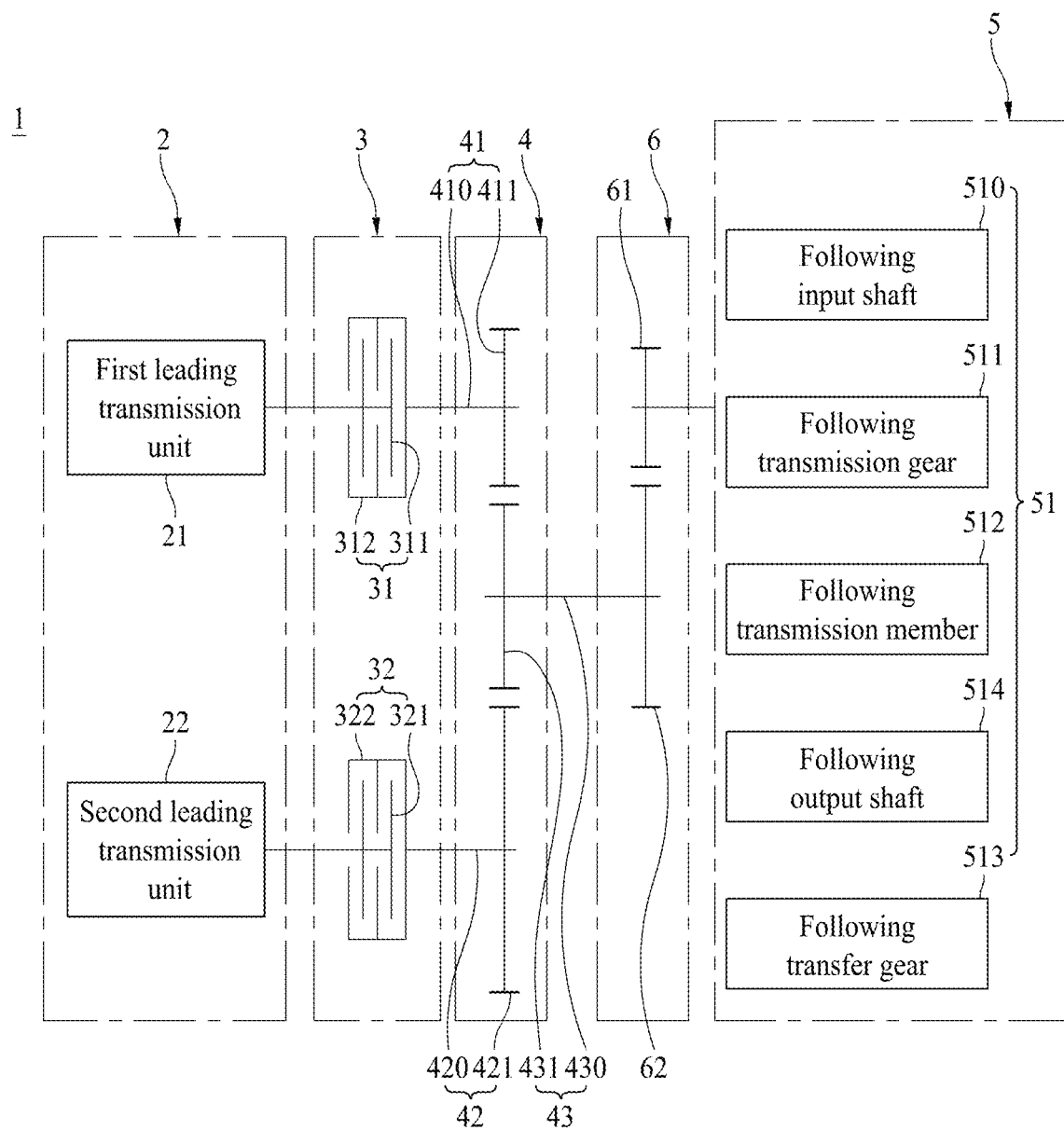

In the case in which the transfer part 6 is provided, as illustrated in FIGS. 14 and 15, the integration unit 43 may be implemented as an embodiment including only the integration shaft 430 and a first integration gear 431. In this case, the transfer part 6 may be connected to the above-described following transmission unit 51 according to the first embodiment or the above-described following transmission unit 51 according to the second embodiment.

Figure 16:
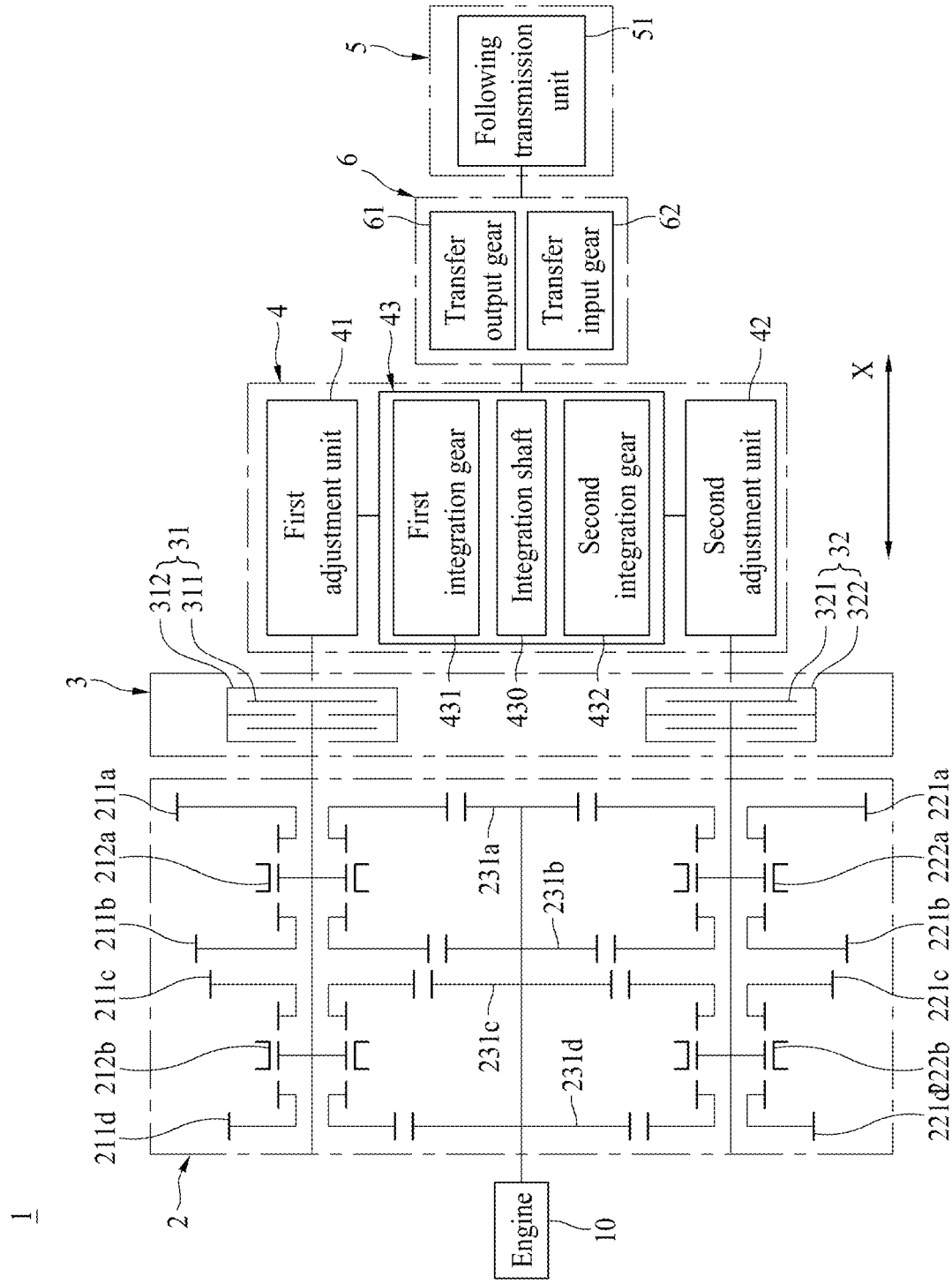
Figure 17:
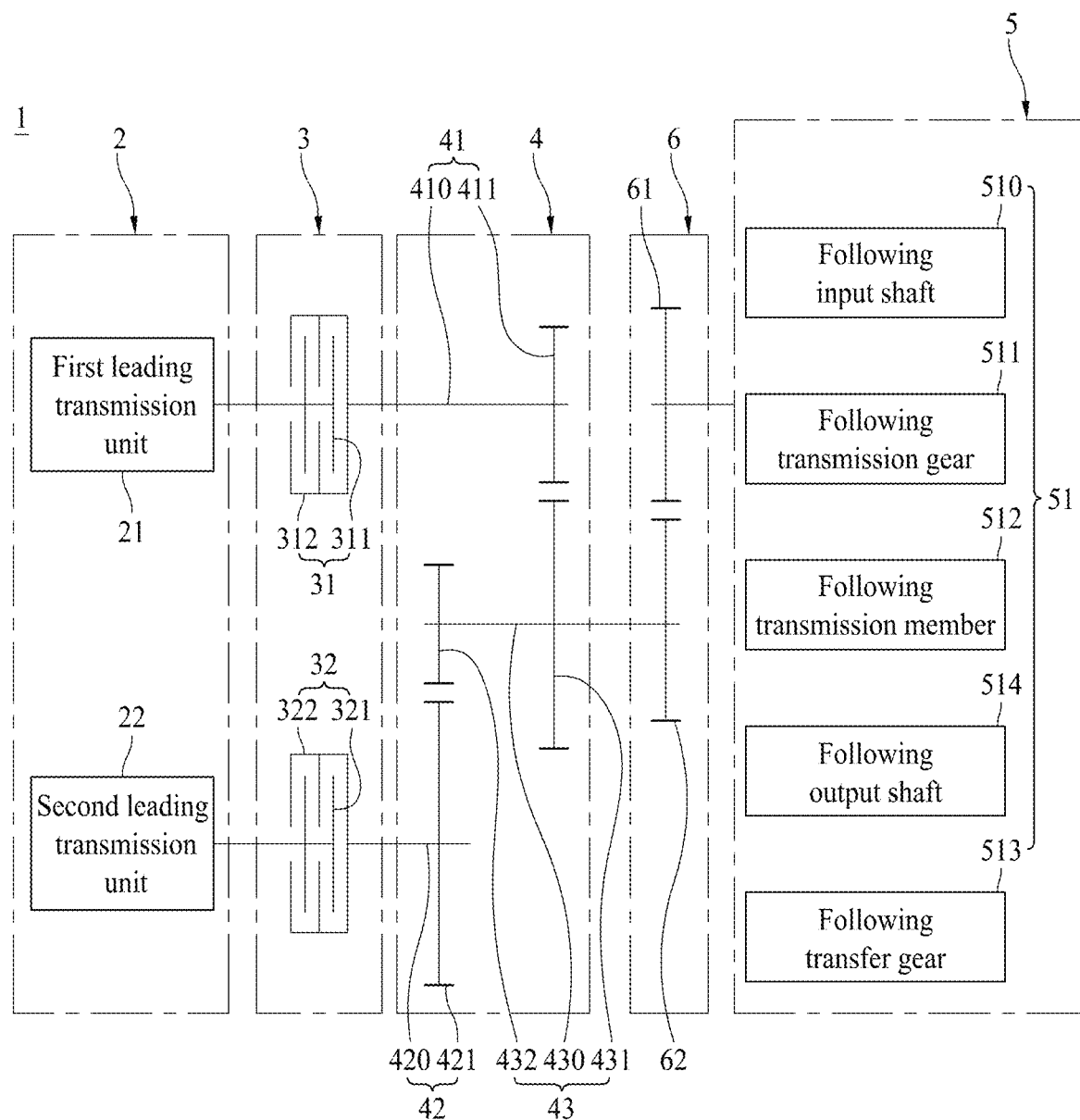

In the case in which the transfer part 6 is provided, as illustrated in FIGS. 16 and 17, the integration unit 43 may be implemented as an embodiment including the integration shaft 430, the first integration gear 431, and a second integration gear 432. In this case, the transfer part 6 may be connected to the above-described following transmission unit 51 according to the first embodiment or the above-described following transmission unit 51 according to the second embodiment.

The present disclosure described above is not limited to the above-described embodiments and the accompanying drawings, and it will be apparent to those skilled in the art that various substitutions, modifications, and changes are possible without departing from the technical spirit of the embodiment.

The invention claimed is:

1. A transmission apparatus for an agricultural vehicle, comprising:
    a leading transmission part which shifts power transmitted from an engine of an agricultural vehicle;
    a clutch part connected to the leading transmission part to selectively output power transmitted from the leading transmission part;
    an adjustment part connected to the clutch part; and
    a following transmission part connected to the adjustment part to shift power transmitted from the adjustment part,
    wherein the leading transmission part includes a first leading transmission unit which shifts the power transmitted from the engine and a second leading transmission unit which shifts the power transmitted from the engine,
    the clutch part includes a first clutch unit connected to the first leading transmission unit to selectively output power transmitted from the first leading transmission unit and a second clutch unit connected to the second leading transmission unit to selectively output power transmitted from the second leading transmission unit,
    the adjustment part includes a first adjustment unit connected to the first clutch unit, a second adjustment unit connected to the second clutch unit, and an integration unit connected to both the first adjustment unit and the second adjustment unit, and
    the following transmission part includes one following transmission unit connected to the integration unit
    wherein the first adjustment unit includes a first adjustment gear rotated by power transmitted from the first clutch unit;
    the second adjustment unit includes a second adjustment gear rotated by power transmitted from the second clutch unit; and
    the integration unit includes:
        a first integration gear engaged with the first adjustment gear to shift power at a first gear ratio;
        a second integration gear engaged with the second adjustment gear to shift power at a second gear ratio; and
        an integration shaft to which the first integration gear and the second integration gear are coupled and which is rotated by power transmitted from any one of the first integration gear and the second integration gear,
    wherein a first diameter value which is a sum of a diameter of the first adjustment gear and a diameter of the first integration gear and a second diameter value which is a sum of a diameter of the second adjustment gear and a diameter of the second integration gear are the same,
    wherein the first integration gear is engaged with the first adjustment gear, and the first integration gear is not engaged with the second adjustment unit;
    the second integration gear is engaged with the second adjustment gear, and the second integration gear is not engaged with the first adjustment unit;
    when the first clutch unit operates to output power, the power, which is shifted while the power is transferred through the first adjustment gear and the first integration gear, is transmitted to the following transmission part through the integration shaft, and when the second clutch unit operates to output power, the power, which is shifted while the power is transmitted through the second adjustment gear and the second integration gear, is transmitted to the following transmission part through the integration shaft.

2. The transmission apparatus of claim 1, wherein:
the first integration gear and the second integration gear are disposed at positions spaced apart from each other and formed to have diameters that are different from each other, and
the first adjustment gear and the second adjustment gear are formed to have diameters that are different from each other.

3. The transmission apparatus of claim 1, comprising a transfer part connected to each of the adjustment part and the following transmission unit, wherein:
the transfer part includes a transfer output gear connected to the following transmission unit and a transfer input gear engaged with the transfer output gear and connected to the adjustment part;
the following transmission unit includes a following input shaft connected to the transfer part;
the transfer output gear is coupled to the following input shaft; and
the transfer input gear is coupled to the integration shaft.

4. The transmission apparatus of claim 1, wherein the first leading transmission unit and the second leading transmission unit are implemented to be the same to shift power at the same gear shift ratio.

5. The transmission apparatus of claim 1, wherein:
the leading transmission part includes a leading transmission input unit which transmits the power transmitted from the engine to each of the first leading transmission unit and the second leading transmission unit;
the leading transmission input unit includes a plurality of leading transmission input gears which are engaged with a plurality of first leading transmission gears included in the first leading transmission unit and a plurality of second leading transmission gears included in the second leading transmission unit; and
the first leading transmission gears and the second leading transmission gears, which are engaged with one sides and the other sides of the leading transmission input gears, are formed to be the same to shift power at the same gear shift ratio.

* * * * *